(12) United States Patent
Sakagawa et al.

(10) Patent No.: US 6,421,321 B1
(45) Date of Patent: Jul. 16, 2002

(54) APPARATUS AND A METHOD FOR TRANSFERRING A PACKET FLOW IN A COMMUNICATION NETWORK

(75) Inventors: Kazuo Sakagawa, Nagoya; Jun Ogawa, Kawasaki, both of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/019,403

(22) Filed: Feb. 5, 1998

(30) Foreign Application Priority Data

Feb. 25, 1997 (JP) .............................................. 9-041159

(51) Int. Cl.[7] .............................................. H04L 12/26
(52) U.S. Cl. ................ 370/238.1; 370/248; 370/395.52
(58) Field of Search ................................ 370/238, 248, 370/249, 252, 392, 395, 396, 402, 465, 238.1, 395.5, 395.51, 395.52

(56) References Cited

U.S. PATENT DOCUMENTS

| | | | | |
|---|---|---|---|---|
| 5,583,996 A | * | 12/1996 | Tsuchiya | ............... 395/200.15 |
| 5,633,866 A | * | 5/1997 | Callon | ......................... 370/397 |
| 5,828,844 A | * | 10/1998 | Civanlar et al. | ........ 395/200.58 |
| 5,909,441 A | * | 6/1999 | Alexander, Jr. et al. | .... 370/395 |
| 6,021,263 A | * | 2/2000 | Kujoory et al. | ........ 395/200.62 |
| 6,147,993 A | * | 11/2000 | Kloth et al. | ................. 370/392 |
| 6,189,041 B1 | * | 2/2001 | Cox et al. | .................... 709/238 |

* cited by examiner

*Primary Examiner*—Melvin Marcelo
(74) *Attorney, Agent, or Firm*—Katten Muchin Zavis Rosenman

(57) ABSTRACT

An apparatus and a method for transferring a packet flow having a plurality of packets in a communication network which includes plural subnetworks, first and second end systems connected to the respective subnetworks and a transit system for relaying the packet and a message between the first and second end systems through a default route, where the packet flow is forwarded from the first end system to the second end system or to a terminal connected to the second end system, in the first end system, determines it by collating the packet with a predetermined criterion whether to forward the packet flow through a shortcut path bypassing the default route and in dependence upon the determining, sends to the second end system through the default route, a request message requesting to set the shortcut path, along with an address of the first end system; in the second end system, requests the communication network to set the shortcut path between the first and second end systems in accordance with the request message; and in the first and second end systems, forwards the packet flow through the shortcut path.

26 Claims, 21 Drawing Sheets

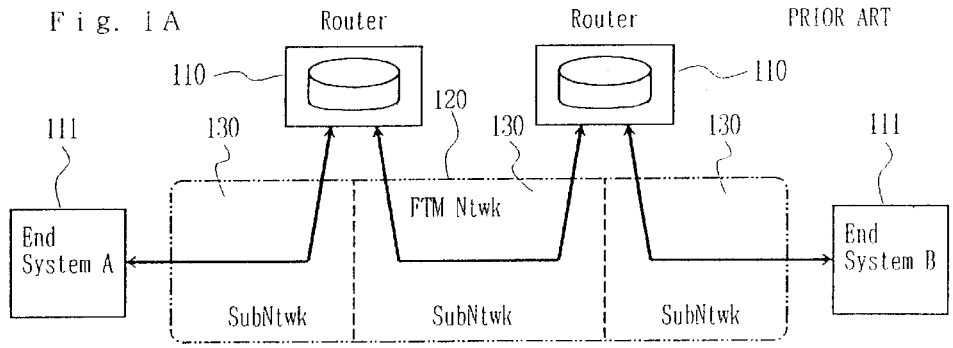
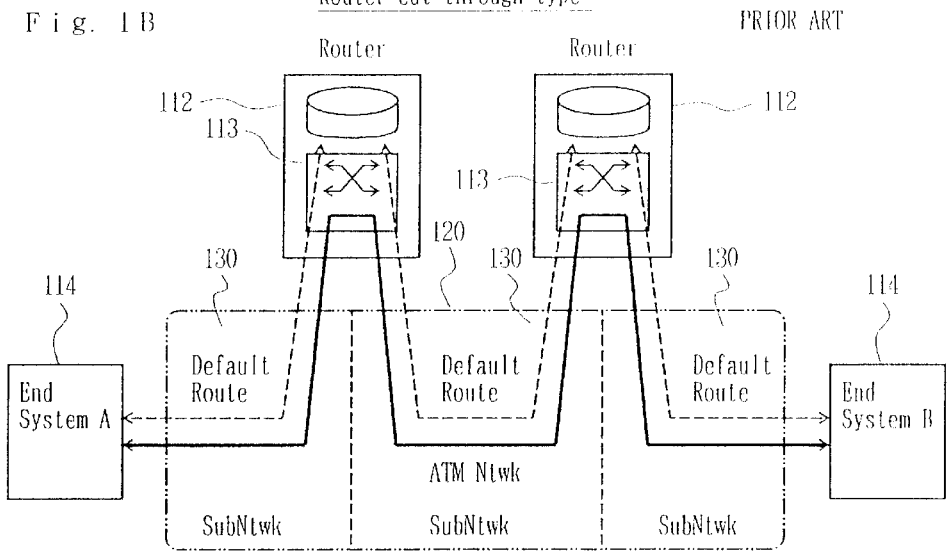
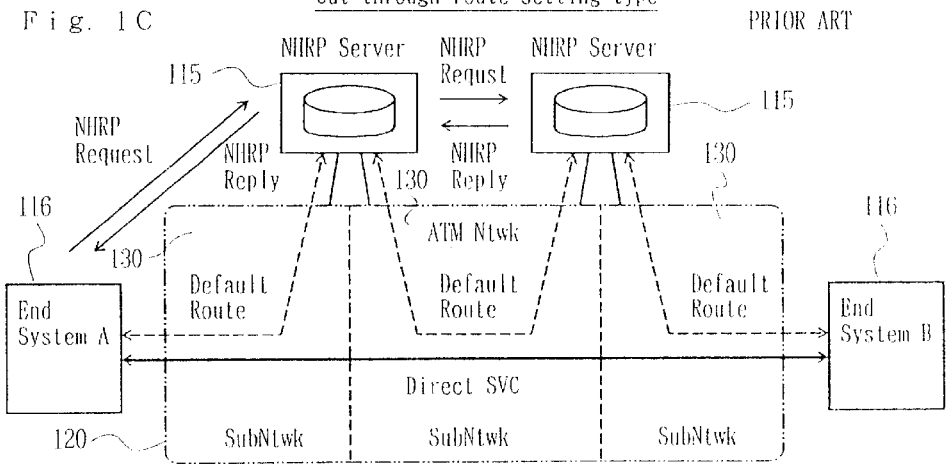

Fig. 16A  SP Request Message Format

| (1) | Network Identification Number | | |
|---|---|---|---|
| (2) | Message Type Identification Code (0 for SP Request Msg) | | |
| (3) | Message Idintifier (Request ID) | | |
| (4) SP Req Msg Sdr Xmsn Adrs Type | (5) SP Req Msg Ser Xmsn Adrs Lg | (6) SP Req Msg Sdr Xmsn Adrs | |
| (7) SP Req Msg Sdr Protcl Adrs Type | (8) SP Req Msg Sdr Protcl Adrs Lg | (9) SP Req Msg Ser Protcl Adrs | |
| (10) SP Req Msg Destn Protcl Adrs Type | (11) SP Req Msg Destn Protcl Adrs Lg | (12) SP Req Msg Destn Protcl Adrs | |
| (13) VC Sharing | | (14) No of Fltr Spec | |
| (15) Fltr Spec No | (16) Fltr Spec Lg | (17) Fltr Spec Cont | |
| (15)  . . . | (16)  . . . | (17)  . . . | |

Fig. 16B  SP Reply Message Format

| (1) | Network Identification Number | | |
|---|---|---|---|
| (2) | Message Type Identification Code (1 for SP Reply Msg) | | |
| (3) | Message Idintifier (Request ID) | | |
| (4) SP Reply Msg Sdr Xmsn Adrs Type | (5) SP Reply Msg Sdr Xmsn Adrs Lg | (6) SP Reply Msg Sdr Xmsn Adrs | |
| (7) SP Reply Msg Sdr Protcl Adrs Type | (8) SP Reply Msg Sdr Protcl Adrs Lg | (9) SP Reply Msg Sdr Protcl Adrs | |
| (10) reserved | (11) reserved | (12) reserved | |
| (13) VC Sharing | | (14) No of Fltr Spec | |
| (15) Fltr Spec No | (16) Fltr Spec Lg | (17) Fltr Spec Cont | |
| (15)  . . . | (16)  . . . | (17)  . . . | |

Fig. 17A  SP Initiation Message Format

| (1) | Network Identification Number | | |
|---|---|---|---|
| (2) | Message Type Identification Code (4 for SP Init Msg) | | |
| (3) | reserved | | |
| (4) reserved | (5) reserved | | (6) reserved |
| (7) SP Init Msg Sdr Protcl Adrs Type | (8) SP Init Msg Sdr Protcl Adrs Lg | | (9) SP Init Msg Sdr Protcl Adrs |
| (10) SP Init Msg Destn Protcl Adrs Type | (11) SP Init Msg Destn Protcl Adrs Lg | | (12) SP Init Msg Destn Protcl Adrs |
| (13) Fltr Spec No | (14) Fltr Spec Lg | | (15) Fltr Spec Cont |

Fig. 17B  SP Initiation NAK Message Format

| (1) | Network Identification Number | | |
|---|---|---|---|
| (2) | Message Type Identification Code (5 for SP Init NAK Msg) | | |
| (3) | reserved | | |
| (4) reserved | (5) reserved | | (6) reserved |
| (7) reserved | (8) reserved | | (9) reserved |
| (10) SP Init NAK Msg Destn Protcl Adrs Type | (11) SP Init NAK Msg Destn Protcl Adrs Lg | | (12) SP Init NAK Msg Destn Protcl Adrs |
| (13) Fltr Spec No | (14) Fltr Spec Lg | | (15) Fltr Spec Cont |

Fig. 17C  Cache Update Message Format

| (1) | Network Identification Number | |
|---|---|---|
| (2) | Message Type Identification Code (1 for Cache Update Msg) | |
| (3) | Message Idintifier (Request ID) | |
| (4) VC Sharing | | (5) No of Fltr |
| (6) Fltr Spec No | (7) Fltr Spec Lg | (8) Fltr Spec Cont |
| (6) . . . | (7) . . . | (8) . . . |

Fig. 18A

Egress Cache Format

| (1) Fltr Spec Cont | End System Address | | (4) Port | (5) VPI/VCI | (6) VC Sharing |
|---|---|---|---|---|---|
| | (2) Protocol Address | (3) Network Address | | | |

Fig. 18B

Ingress Cache Format

| (1) Port | (2) VPI/VCI | (3) Fltr Spec Cont |
|---|---|---|

Fig. 19

Filter Specification

| (1) Fltr Spec Type No | (2) Filter Specification Content |
|---|---|
| Type 1 | Destination Network Address |
| 2 | Destination Host Address |
| 3 | Pkt Sdr Network Address, Pkt Destn Network Address |
| 4 | Pkt Sdr Host Address, Pkt Destn Host Address |
| 5 | Pkt Sdr Host Adrs/ Port No, Pkt Destn Host Adrs/ Port No |
| ⋮ | ⋮ |

Fig. 20A

SPH-A Egress Cache

| (1) Fltr Spec Cont | End System Address | | (4) Port | (5) VPI/VCI | (6) VC Sharing |
|---|---|---|---|---|---|
| | (2) Protocol Address | (3) Network Address | | | |
| LAN-C IP Network Address | SPR-C IP Host Address | SPR-C ATM Address | 1 | 0/100 | Permissible |

Fig. 20B

SPH-A Ingress Cache

| (1) Port | (2) VPI/VCI | (3) Fltr Spec Cont |
|---|---|---|
| 1 | 0/100 | SPH-A IP Host Address |

Fig. 20C

SPR-C Egress Cache

| (1) Fltr Spec Cont | End System Address | | (4) Port | (5) VPI/VCI | (6) VC Sharing |
|---|---|---|---|---|---|
| | (2) Protocol Address | (3) Network Address | | | |
| SPH-A IP Host Address | SPH-A IP Host Address | SPH-A ATM Address | 1 | 0/100 | Permissible |

Fig. 20D

SPR-C Ingress Cache

| (1) Port | (2) VPI/VCI | (3) Fltr Spec Cont |
|---|---|---|
| 1 | 0/100 | LAN-C IP Network Address |

Fig. 21A

SPH-A Egress Cache

| (1) Fltr Spec Cont | End System Address | | (4) Port | (5) VPI/VCI | (6) VC Sharing |
|---|---|---|---|---|---|
| | (2) Protocol Address | (3) Network Address | | | |
| LAN C/LAN-D IP Network Address | SPR-C IP Host Address | SPR-C ATM Address | 1 | 0/100 | Permissible |

Fig. 21B

SPH-A Ingress Cache

| (1) Port | (2) VPI/VCI | (3) Fltr Spec Cont |
|---|---|---|
| 1 | 0/100 | SPH-A IP Host Address |

Fig. 21C

SPR-C Egress Cache

| (1) Fltr Spec Cont | End System Address | | (4) Port | (5) VPI/VCI | (6) VC Sharing |
|---|---|---|---|---|---|
| | (2) Protocol Address | (3) Network Address | | | |
| SPH-A IP Host Address | SPH-A IP Host Address | SPH-A ATM Address | 1 | 0/100 | Permissible |

Fig. 21D

SPR-C Ingress Cache

| (1) Port | (2) VPI/VCI | (3) Fltr Spec Cont |
|---|---|---|
| 1 | 0/100 | LAN-C/LAN-D IP Network Addresses |

APPARATUS AND A METHOD FOR TRANSFERRING A PACKET FLOW IN A COMMUNICATION NETWORK

BACKGROUND OF THE INVENTION

1. Field of the Invention

The present invention relates to an apparatus and a method for transferring a packet flow in a communication network. A conventional network for use within an enterprise or an Intranet has developed with an emphasis on transferring mails and news over a wide area, sharing resources (e.g., files and printers) and improving business efficiency within a work group.

In such a network, terminals in a group are interconnected via a common transmission path called a "local area network" (called LAN) including the "Ethernet". A typical network system is formed by interconnecting the LANs of respective work groups through a backbone network such as Fiber Distributed Data Interface (called FDDI). The traffic in such a network system consisted mainly of so-called local traffic including data transmitted to/from the shared files and the printers.

In recent years, as the Internet is spreading to wider and wider areas and as multi-media applications are becoming more and more popular with the increasing access to the WWW (World Wide Web) service, the traffic resulting from work-group LANs accessing external resources is increasing rapidly. Further, even middleware is suffering changes as seen in the increase of applications (e.g., voice and animation) requiring high transmission speed and quality and in the development of multi-media handling protocols.

Such changes in recent years are causing performance limits to the conventional information forwarding protocols particularly in a backbone network, i.e., the "hop-by-hop best-effort" forwarding methods through routers. Accordingly, a new method and apparatus for forwarding information in the backbone network is in great demand.

2. Description of the Related Art

A new technology for transferring packets by using the address of the Network Layer Protocol (e.g., IP address of the TCP/IP protocol) in the communication network, esp. in the NBMA network (typically the ATM network) are currently being studied by international organizations such as the ATM forum (an industrial group for standardizing the ATM LAN). The conventional method for transferring packets are divided roughly into following three types.

FIGS. 1A–1C illustrate the conventional packet transfer method in a communication network. The three methods are explained below, taking as an example in which the ATM network is used for a communication network and the TCP/IP is used for a high-layer protocol.

(1) Subnet-Relay Type

FIG. 1A illustrates a subnet-relay type packet transfer method, where a single ATM network including three logical subnetworks (hereinafter simply called a subnetwork or subnet) is shown. The subnet relay type, which is the most popular in a so-constructed network, connects subnetworks 130 with each other through routers 110 provided therebetween. The known LAN emulation method and the classical IP-over-ATM method are of this type. Here, an end system 111 is a general term for a terminal connected directly to the ATM network and a router located at an entrance/exit (or ingress/egress) to/from the ATM network from a legacy LAN or another type of network.

An IP packet is divided into ATM cells and forwarded directly between end systems 111 which belong to the same subnetwork. However, if the end systems belong to different subnetworks (as shown in FIG. 1A as end systems A and B), the ATM cells are transmitted from a subnetwork to another through router 110 provided therebetween (as shown by a heavy line) even when the end systems are included in a single ATM network in which the packet is transmitted on an ATM cell basis. The ATM cells received by the router are once converted into an IP packet for relay processing and again to the ATM cells to be sent to the ATM network. That is, the relay processing is conducted in the IP layer. It is a problem that this type requires time since the relay processing is executed mostly by software.

(2) Router-cut-through Type

FIG. 1B illustrates a router-cut-through type, which is provided with a router between subnetworks 130 as in the aforesaid subnet-relay type. However, it has an ATM cell switching function in the router. An ATM switch 113, provided in router 112, performs first the relay processing on the packet received through a default route in the IP layer as in the aforesaid subnet-relay type. The default route is previously provided corresponding to destinations, to pass therethrough a packet without a route specified. The default route is shown by a dotted line, which corresponds to that shown by the heavy line in the aforesaid subnet-relay type.

Since the relay processing by software requires time as mentioned above, when detecting such a packet flow as that of the FTP (File Transfer Protocol) and HTTP (Hiper Text Transfer Protocol), for which a short-cut path is useful, router 112 establishes an SVC (Switched Virtual Circuit) between the input and output ports of ATM switch 113. The packets input to router 112 thereafter are routed through the thus-established SVC and are relayed through the heavy line by cutting through ATM switch 113, thus speeding up the packet relaying.

(3) Cut-through-route-setting Type

FIG. 1C illustrates a cut-through-route-setting type, which has a router provided between subnetworks 130 as in the aforesaid relay types (1) and (2). First, a packet is processed in a Next Hop Resolution Server 115 (hereinafter simply called a server), which has the same router function as in the aforesaid relay types (1) and (2), and is forwarded through the default route shown by the dotted line in FIG. 1C.

When recognizing the packet flow as that of the aforesaid FTP and HTTP, an end system 116 (end system A), which is the ingress system for the packet flow, establishes a direct SVC between end system A and other end system 116 (end system B) which is the egress system for the packet flow so as to bypass the router (server). Succeeding IP packets are converted into cells in end system A and, forwarded in the ATM layer through the direct SVC shown by the dotted line in FIG. 1C. However, since ingress system A is not aware of the ATM address of egress system B in this type, system A makes an ATM address resolution request by sending an NHRP Request message including the destination IP address, to a next-hop-resolution-protocol (called NHRP) server 115 (server A here) through the default route.

If server A is not aware of the ATM address of end system B, server A sends the NHRP Request message including the destination IP address, through the default route to the NHRP server 115 (server B here) which is connected to the adjacent subnetwork. When replied with the ATM address of end system B (address resolution reply) by server B, server A replies the end system A's request with the ATM address. End system A requests the ATM network to set a direct SVC between end systems A and B by using the replied ATM address.

Therefore, a mechanism to resolve the ATM address of the egress system based on the destination IP address is needed in this type.

Comparing the three relay types, types 2 and 3 are similar to type 1 in that packets are forwarded through the default route. However, the former two are superior to the latter in the relaying performance since the relaying route in the backbone-network, which passes through routers (called a hop-by-hop relay), is bypassed by the ATM connection.

Comparing types 2 and 3, they differ from each other in the method of setting the bypass route, as seen in the figures. In type 2, the default route and the bypass route are the same although packets are processed in in different ways. Type 2 has difficulties distributing the traffic to plural routes and designing network reliability, since the default route is fixed by the destination and therefore, the bypass route is fixed by the location of the router in the network. To prevent this, even if the bypass mechanism is realized with a high-speed and high-performance router, a further measure is required in the neighboring ATM network, to avoid a traffic concentration, e.g., to provide a high-performance ATM switch capable of processing the traffic concentration or to provide plural routers having the aforesaid cutthough mechanism between the subnetworks.

To say nothing of providing a high-performance ATM switch, providing plural routers requires complex functions for the routers to continuously collate the data held therein, rendering ATM network facilities costly. The related art is explained below taking type (3) as an example, since type (3) is the most superior of the three types from the above consideration.

As a technology to realize the short-circuit route setting type, the NHRP (Next Hop Resolution Protocol) is being studied by IETF (Internet Engineering Task Force), an international Internet technical committee. Also, the MPOA (Multi Protocol over ATM ) is being studied by the ATM forum (industrial standardization group for the ATM LAN) which is also an international organization. It is also approved by the MPOA to utilize the NHRP as the communication method between subnetworks and therefore, the operational outline and problems of the NHRP are explained below.

FIG. 2 illustrates the conventional packet-relay operation by using the NHRP. The configuration of the NHRP is explained first referring to FIG. 2.

(a) All ATM terminals 119 (hereinafter called NHC: NHRP Client) connected to a subnetwork 131 (called an LIS: Logical IP Subnetwork) can set a default route path through to a default router (router 118 in FIG. 2) which controls communication between the LIS and the other LIS.

(b) Also, all NHCs 119 can set a path to a server 117 which manages the address relationship between the ATM address and the high-layer IP address for the NHCs within LIS 131 (hereinafter the server is called an NHS: NHRP Server). By using the path, NHC 119 registers and updates the address relationship (i.e., ATM address vs. the IP address) thereof in NHS 117. Thus, NHS 117 prepares and manages the address data table (not shown in FIG. 2) including the address relationship of NHCs 119 within the LIS.

(c) If router 118 is also provided with a function of the NHS, the paths mentioned in (a) and (b) can be the same one single path as shown in FIG. 2; otherwise, above-mentioned two separate paths are required for reliability purposes. Further, when plural NHSs are provided in an LIS 131, plural paths interconnecting NHSs 117 are required to be set within LIS 131.

Next, the basic operation of NHRP is explained referring to FIG. 2.

(a) An IP packet is first transmitted from an NHC 119 (NHC-A) through the default route shown by dotted line ①.

(b) When the NHC-A has determined that the packet flow is to be forwarded though the shortcut path by examining the packet transmitted through the default route①, it sends an NHRP request message (NHRP Req ②) to NHS 117 (NHS-A) to inquire the ATM address of the destination ATM end system (NHC-B).

(c) On receipt of the message, NHS-A examines whether the ATM address concerned is registered in the address data table. If registered, NHS-A replies with an NHRP reply message (NHRP Rep ⑤); unless registered, it forwards the NHRP request message (NHRP Req ③) to a neighboring NHS 117 (NHS-B).

(d) On receipt of the message, NHS-B conducts the same processing as in (c) above.

(e) When the ATM address of the destination end system (NHC-B) is determined by the NHS through the above operations (c) and (d), the NHRP reply message is returned to source NHC-A requesting an address resolution, as shown e.g., by lines ④ and ⑤.

(f) The source NHC-A requests the ATM network to establish a direct route to NHC-B by using the ATM address obtained by the NHRP reply message and forwards the succeeding packet flow through the established direct route ⑥.

This method, in which the clients (NHCs) and servers (NHSs) cooperate in resolving the ATM address of the end systems within the ATM network, has the following problems:

(1) In addition to the default route, permanent paths are needed between the NHCs and the NHS, between the NHSs each serving different LISs, and between NHSs all provided in the same LIS and each serving different NHCS. Moreover, now that a technique to automatically select and set such paths is not yet established, a network manager is required to do the work manually, taking the subnetwork configuration into consideration.

(2) The NHCs need previously register the network address data in the NHS database Also, the NHS need periodically update the registered data by communicating with the NHCs to maintain the database. This causes a heavy load to the NHS with the increase in the number of NHCs.

(3) When a trouble to an NHC (e.g., powered off or configured out) occurs, the aforesaid data registered for the NHC need be cleared or changed to maintain the database. This renders the NHS and NHCs complex in construction for the following reasons. The NHS which is in direct control of the troubled NHC, can detect the trouble because the above periodical communication is disabled by the trouble. However, other NHS or NHC which is not in direct control of the troubled NHC, need be informed of the trouble to clear the registered address data. Therefore, the NHS which is in direct control of the troubled NHC need report the trouble to all the NHCs and NHSs that have so far replied thereto or clear the address data of the troubled NHC. This requires the NHS to maintain a history of all the responses and inquiries, causing increasingly serious problems as the network is large-scaled.

(4) To prevent a decrease of the server performance due to solving the above problems (2) and (3), many technical improvements are required such that an NHS which is located halfway in the route, replies with the NHRP reply message (called non-authoritative reply) based on the address data. In FIG. 2, for the NHRP reply message, NHS-B which is an authorative server basically replies to NHC-B with the message, whereas for the non-authoritative reply, NHS-A or any NHS, if located between NHS-A and NHS-B, replies with the NHC-B's ATM address based on the address data stored therein. According to this method, the NHS operates efficiently since a load is prevented from concentrating on a specific NHS; however, it is a problem that a measure is required against the address data being old.

(5) A trouble in an NHS may extend throughout the LIS; however, no protocol for avoiding the problem has yet been established.

(6) When plural LISs manage the address data within an LIS or when an NHS is configured in a dual or duplex system to avoid the problems raised in above (5), the contents of the LISs' database need be synchronized, e.g., by using such a sophisticated protocol as SCSP (Server Cache Synchronization Protocol).

(7) Since the ATM address of a destination ATM end system (i.e., an ATM terminal or a router which is an egress from the ATM network) is available independent of the end system, just by inquiring of the NHS which manages the address, some check mechanism to check the inquiry for validity is required for security purpose.

(8) This method has following problems with the handling of various applications and with the aspects of security.

(a) Even with an aforesaid check mechanism, once a connection is established through a normal procedure by using the ATM address, there is no mechanism to check the way the connection is used, even if used in such a way as maliciously transmitting useless data to the end system too long a time, obstructing the communication.

(b) A mechanism is not established to cope with various applications, such as sharing and occupying a VC (Virtual Channel) and establishing a connection for each application (high-layer session).

(c) There is no protocol for disconnecting the path. Generally, a method is used to disconnect the connection when no-communication state is detected on a shortcut path for a predetermined period (e.g., 20 minutes). However, if the period, which is independent of an application-requested communication, is set large enough compared with the request, the efficiency of network use may decrease. On the contrary, when the period is too small, if an application stops communication temporarily, the path may be disconnected. Moreover, if a control, abnormal or malicious traffic is mixed in the communication, the path may not be disconnected for a long time. These cause serious problems to the network in which the communication rate is charged on a payload basis.

As for the subnet-relay type, since the router need once convert ATM cells to an IP packet every time the ATM cells go from a subnetwork to another, a problem is that it requires time in the relay processing. As for the router-cut-through type, in which a packet passes through a short-cut path within a router to speed up the relay processing, a problem is that it has difficulty distributing the traffic and configuring a highly-reliable and economical network, since the shortcut path is fixed by the location of the routers within the network.

As for the cut-through-route-setting type, although it is free from the aforesaid problems and the route can be set independently of the location of the routers, it need set specific paths between a server and clients and between clients themselves in addition to the default route because of its server/client configuration. A problem is that it is complicated and difficult to design and manage the network. Another problem is that it has difficulties handling various applications and achieving security because it cannot share the shortcut path and a protocol for disconnecting a path has not yet been established.

SUMMARY OF THE INVENTION

It is an object of the present invention to provide an apparatus and a method which can tranfer packets at high speeds and in high-efficiency.

It is another object of the present invention to provide a packet transferring apparatus and method which are economical and highly reliable, particularly in terms of security.

It is still another object of the present invention to provide a packet transferring apparatus and method which a re easy in designing and managing a communication network.

To achieve the above and other objects, the present invention provides determination, request means and instruction means.

In a communication network in which a packet is transferred from a first device to a second device through a third device, the determination means provided in one of the first and second devices or the third device, determines whether to set a path directly connecting the first device to the second device; the request means providedproveded in the one of the first and second device, in dependence upon the determining by the determination means, requests the other of the first and second devices to set the path; and the instruction means provided in the other of the first and second devices, instructs the communication network to set the path.

BRIEF DESCRIPTION OF THE DRAWINGS

FIGS. 1A–1C illustrate the conventional packet relaying method;

FIGS. 16A–16B and 17A–17C show a basic format of the shortcut path setting messages;

FIGS. 18A and 18B show a basic configuration of the egress and ingress caches;

FIG. 19 illustrates the filter specification;

FIGS. 20A–20D and 21A–21D illustrate the contents of the ingress/egress caches.

DESCRIPTION OF THE PREFERRED EMBODIMENTS

Figure 2:
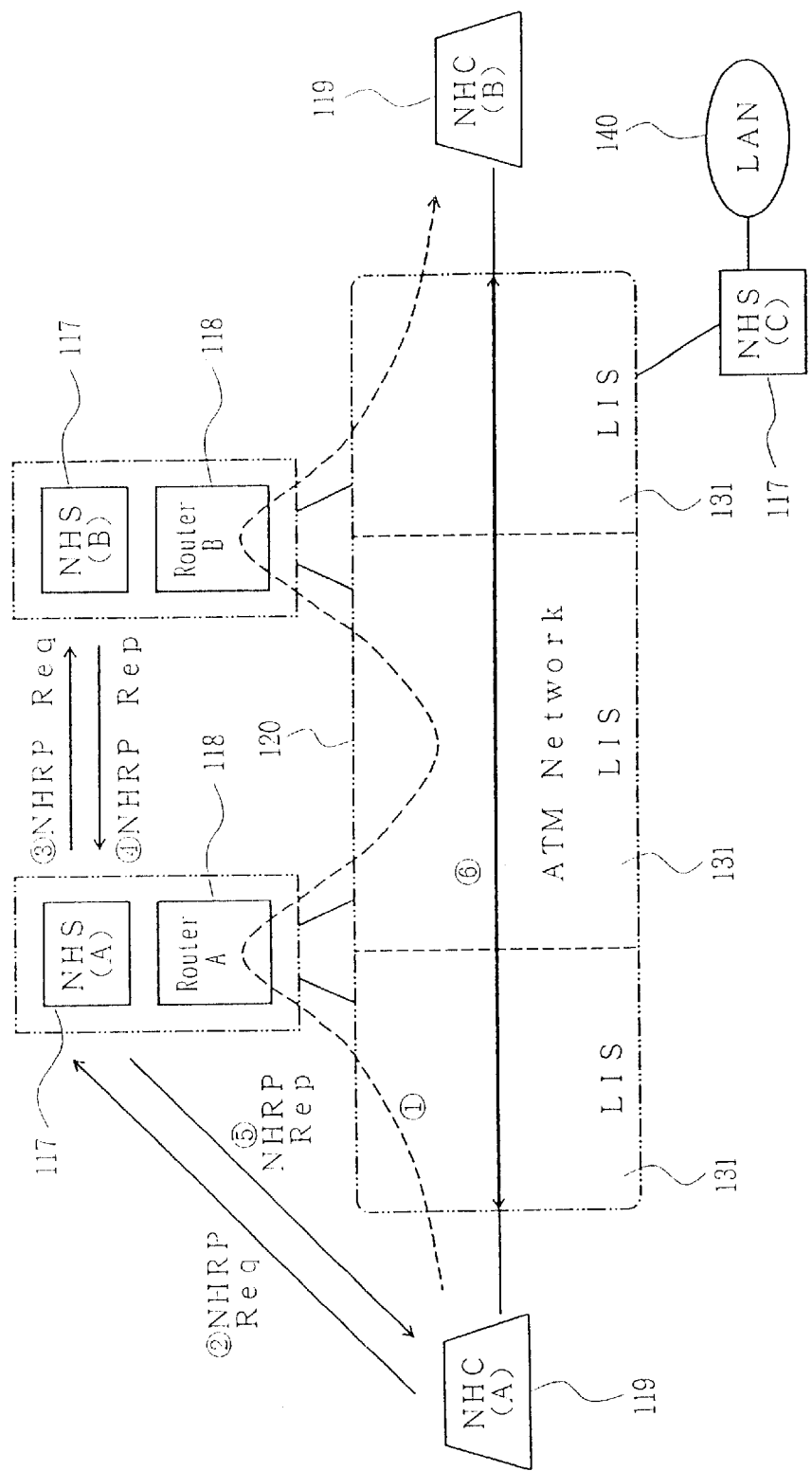
FIG. 2 illustrates the conventional NHRP-type packet relaying method.
Figure 3:
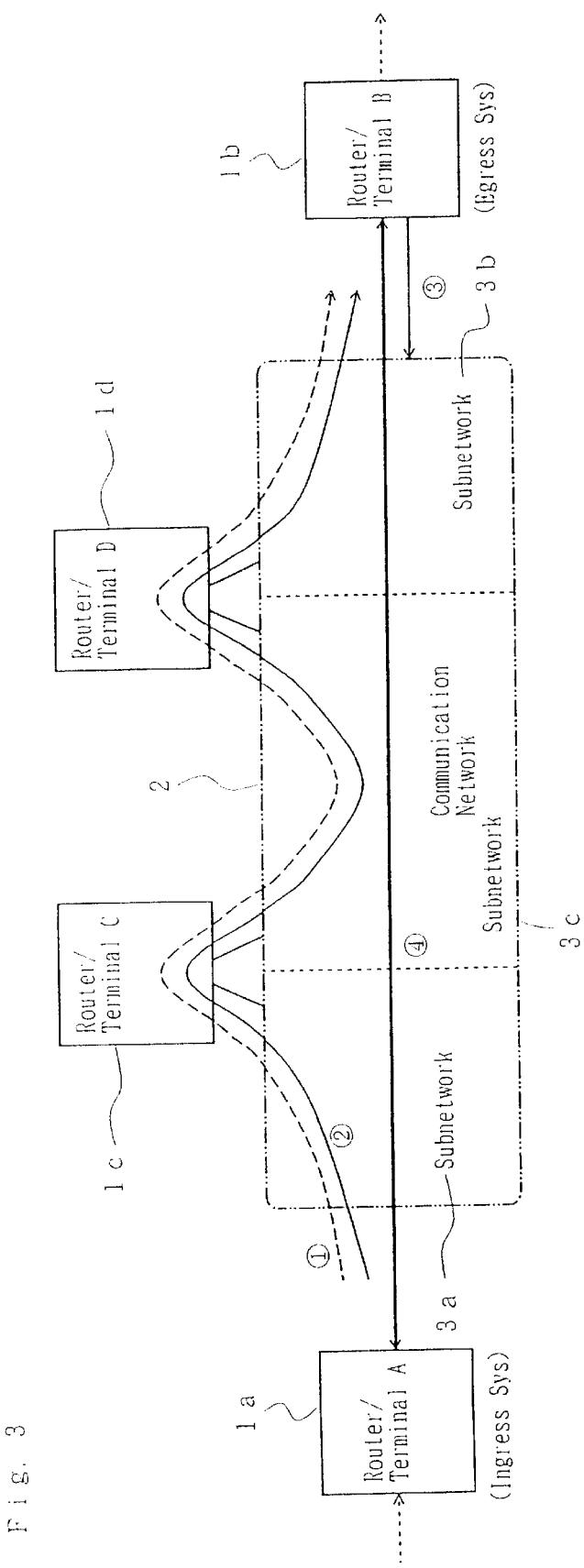
FIG. 3 shows the principle of the packet transfer method of the present invention.
Figure 4:
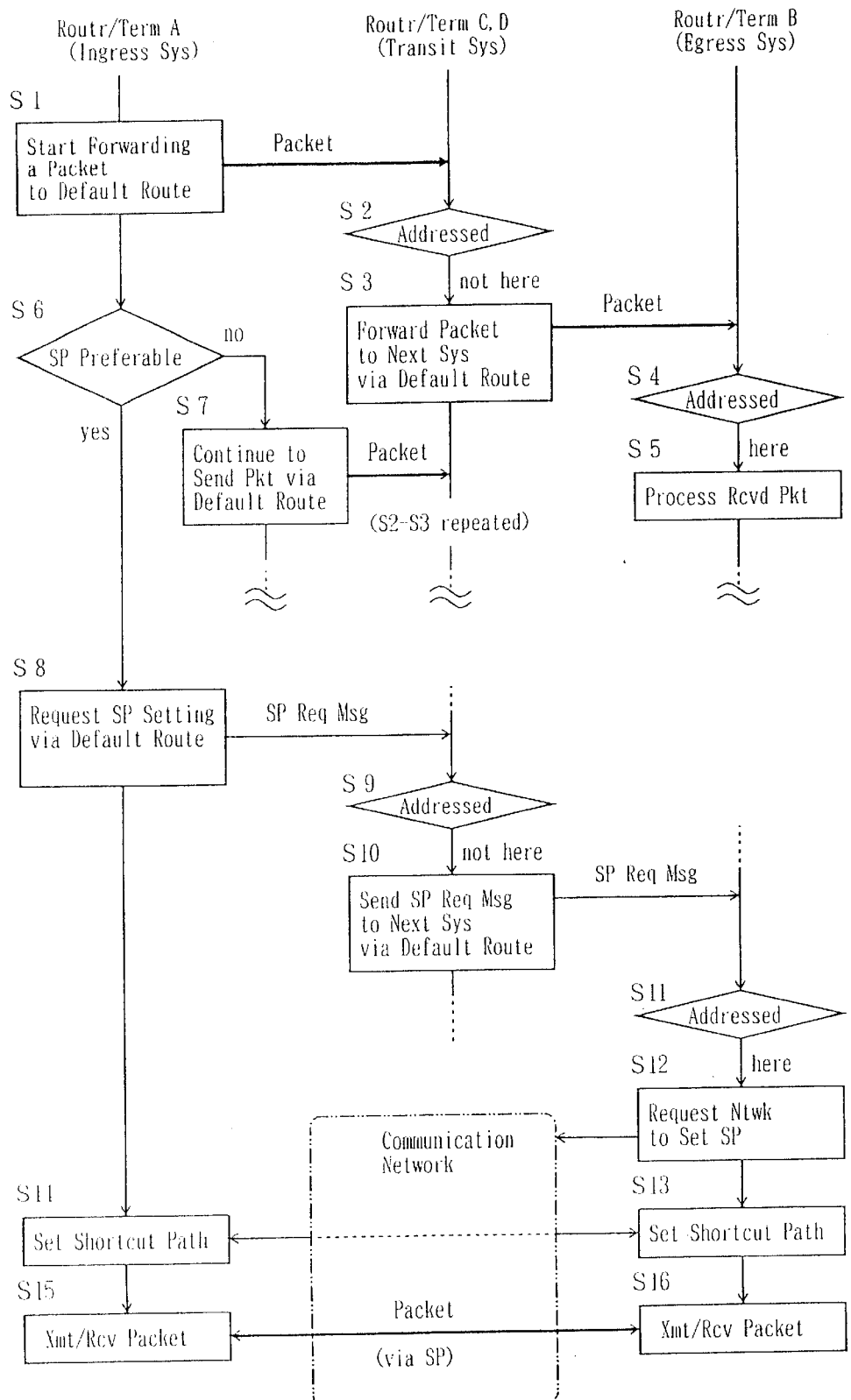
FIGS. 4–6 are flowcharts illustrating the principle of the present invention.
Figure 5:
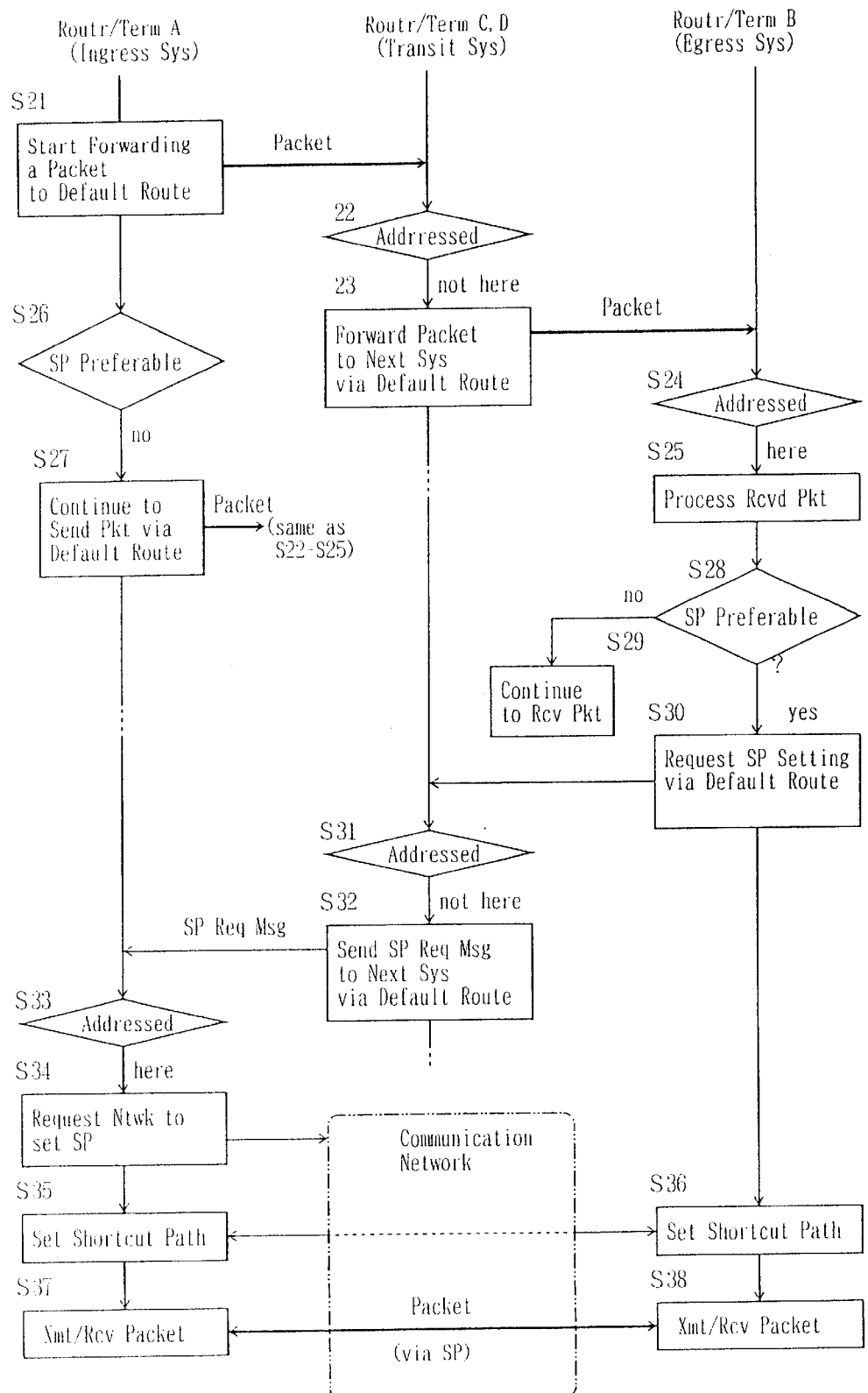
Figure 6:
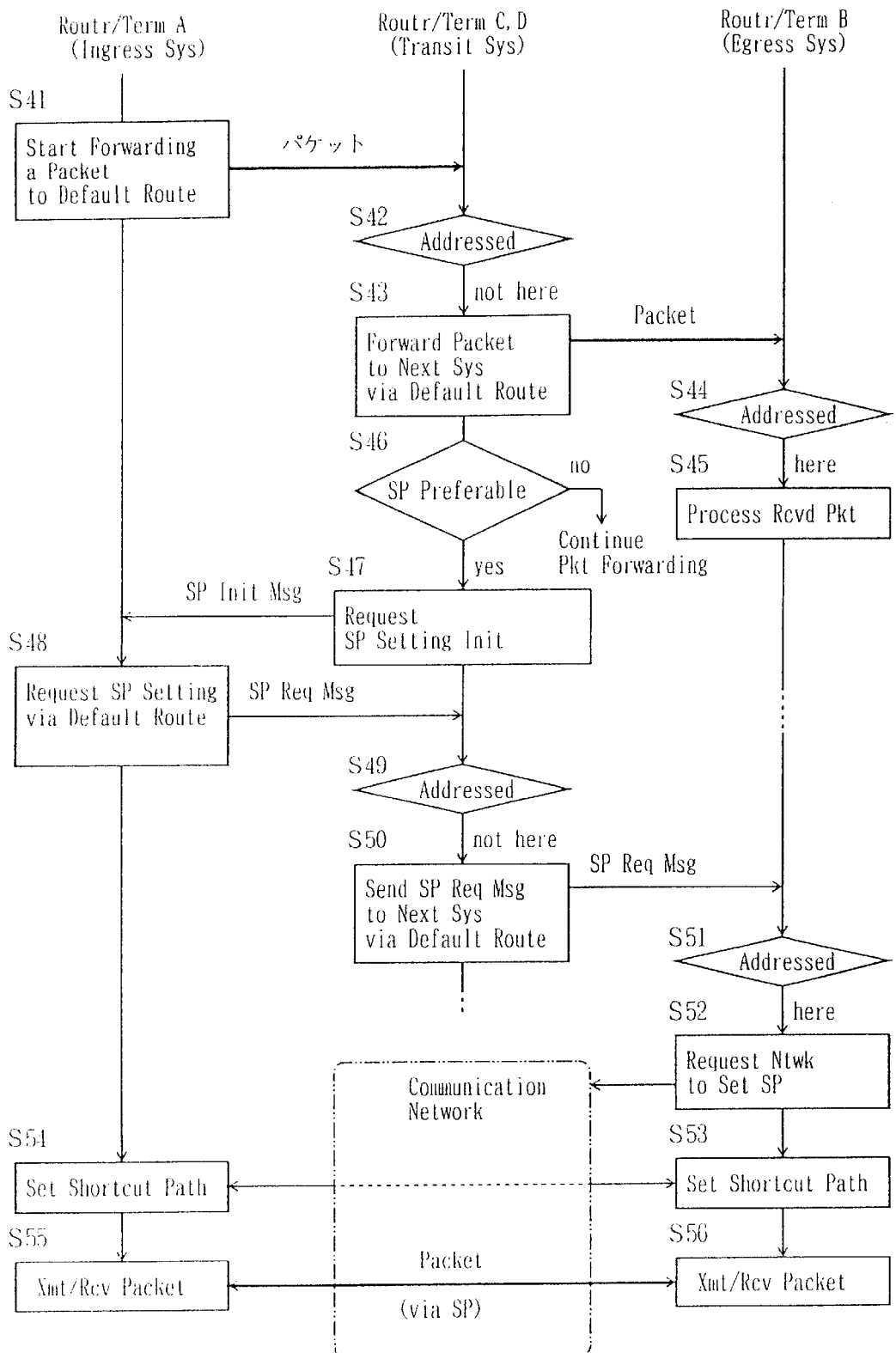

FIG. 3 shows the principle of the packet transfer method of the present invention. FIGS. 4–6 are flowcharts illustrating the principle.

Figure 7:
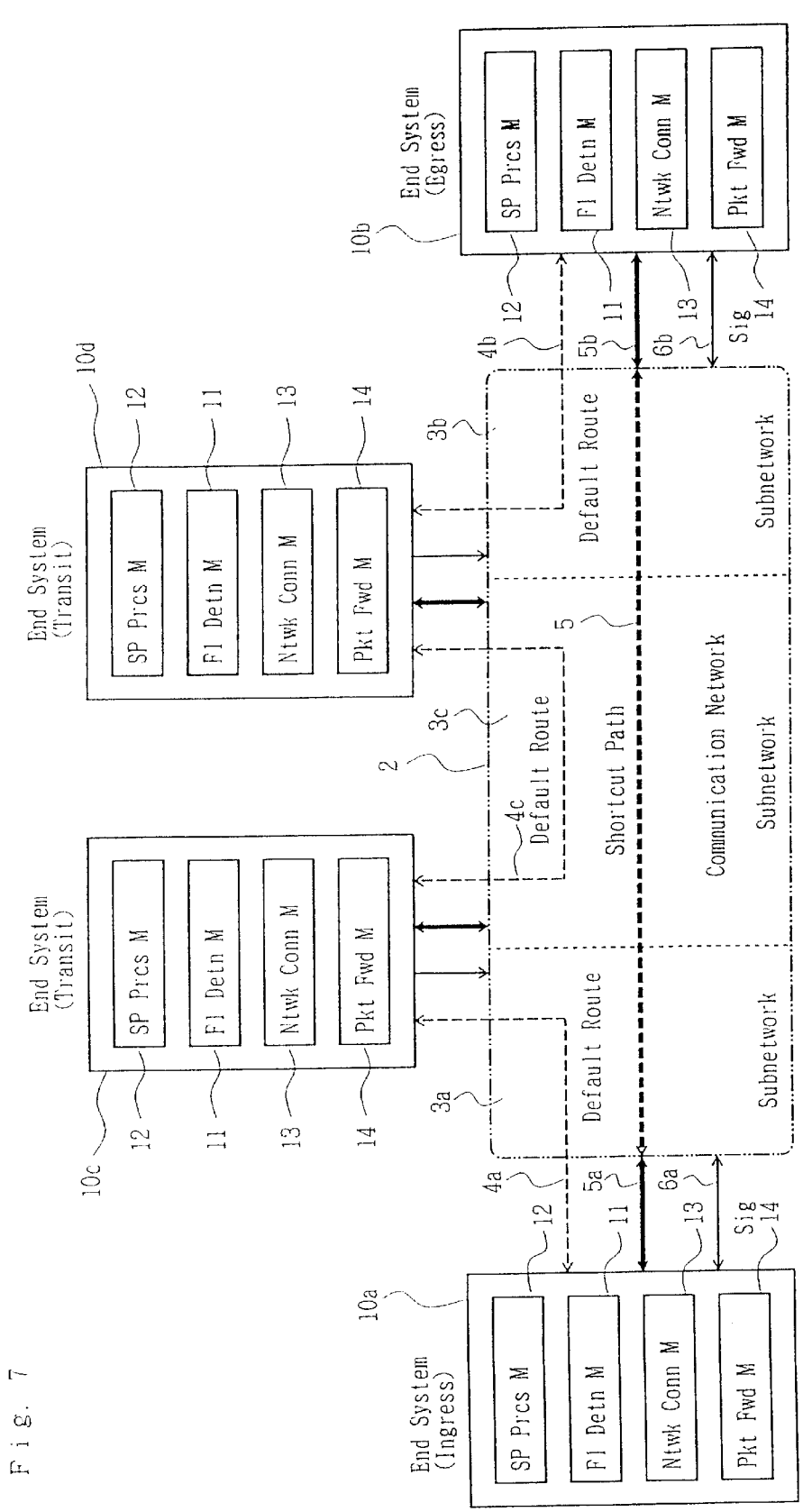
FIG. 7 is a diagram showing basic configuration of an end system.

FIG. 7 is a diagram showing basic configuration of an end system of the present invention.

In FIG. 3, router/terminals 1a–d (generally called router/terminal 1) are connected directly to a communication network 2. Subnetworks 3a–3c (generally called subnetwork 3) constitute the network 2. The network 2 is configured such that a packet is forwarded from a router/terminal 1 which is connected directly to a subnetwork to a destination terminal which is connected to another subnetwork directly or via a router, through a router or a terminal provided on a default route defined previously in the network 2.

In FIG. 7, end systems 10a–10d (generally called end system 10) are connected directly to communication network 2 consisting of subnetworks 3a–3c. End system 10 includes means 11–14. Network connection means 13 requests network 2 to set a path leading to an opposite end system to/from which a packet flow is transmitted/received. Packet forwarding means 14 controls packet and message forwarding.

Flow determination means 11 examines the type of a packet flow being forwarded on the default route by packet forwarding means 14 and when determining it as preferable to forward the packet flow through a route bypassing the default route, instructs shortcut path set means 12 to set a shortcut path (hereinafter shortcut path is abbreviated to SP).

As instructed by the flow determination means 11, when determining that its end system is an egress or ingress from/to network 2 for the packet flow, the SP processing means 12 sends an SP Request message including an end system's address defined in the network, to a destination end system through a default route.

Also, when recognizing that the SP Request message received by the packet forwarding means 14 is not addressed to its own end system, the SP processing means 12 instructs packet forwarding means 14 to pass the message to a default route. When recognizing the message as addressed to its own end system, the SP processing means 12 instructs the network connect control means 13 to set a shortcut path leading to SP-Request-message originating end system 10 based on the address included in the message and after the path is set, instructs packet forwarding means 14 to forward packet flows through the path.

The operational principle of the packet transfer method of the present invention is explained below referring to FIGS. 3–6. The packet transfer method of the present invention sets a shortcut path bypassing the default route in a communication network and forwards a packet from a subnetwork to another through the shortcut path. The method is of a completely autonomous and decentralized control type, in which a shortcut path is set solely by routers or terminals connected directed to the communication network without the need of the NHRP server (see FIG. 1C) and the like.

In FIG. 3, communication network 2 consisting of plural subnetworks 3a–3c, is configured such that a packet is forwarded from a router or a terminal (called router/terminal) connected directly to a subnetwork 3 to a destination terminal connected to another subnetwork 3 directly or through a router, through a router/terminal provided on a default route defined previously in the network 2.

It is assumed that a packet flow is forwarded from a router/terminal 1a (called terminal A) to a router/terminal 1b (called terminal B). Here, terminal A is an entrance through which a packet flow enters network 2 and terminal B is an exit through which a packet flow goes out of network 2 (hereinafter, terminals A and B are called ingress and egress systems, respectively).

The first packet is transmitted from the ingress system to the router/terminal 1c (called router C) which is provided on a default route defined previously in network 2. Router C, on recognizing that the packet is not addressed thereto, passes the packet to the following router/terminal 1d (called router D) through the default route. Router D, on recognizing that the packet is addressed to terminal B which is connected to subnetwork 3c to which router D is also connected, sends the received packet to terminal B through the default route. The route through which the packet is forwarded is shown in FIG. 3 by the dotted line ①.

While forwarding the packet, terminal A determines if it is preferable to forward the packet through a path bypassing the default route and if so, sends the SP Request message including the terminal A's address defined in the network (hereinafter called network address), to a destination terminal D through the default route.

Thus, the SP Request message is forwarded sequentially toward the routers/terminals (routers C and D here) through the default route in the same way as the first packet. Routers C and D, on recognizing that the message is not addressed to them or a terminal connected thereto, pass the message to the following router (routers C and D are called transit systems here). Terminal B, when recognizing that the received message is addressed thereto, determines itself to be an egress system. The route through which the message is forwarded is shown in FIG. 3 by line ②, which route is the default route as for the first packet.

Then, egress system terminal B requests network 2 to set a shortcut path leading to the ingress system terminal A by using the terminal A's network address included in the SP Request message. The route through which the request is made is shown in FIG. 3 by line ③. Thereafter, the packets are forwarded between the ingress and egress systems through the thus-set shortcut path shown FIG. 3 by heavy line ④.

In the above example, the ingress system determines whether to forward a packet flow through a path bypassing the default route and the egress system makes a shortcut path setting request. However, other end systems may make the determination and the request as in other examples shown in flowchart of FIGS. 4–6, where the router/terminals (may be called devices) are given with the same numeral as in FIG. 3 and a single transit system represents the routers C and D.

FIG. 4 is a flowchart illustrating the operation explained based on FIG. 3. When a router/terminal (terminal A) transmits the first packet to the default route (FIG. 4 step S1), the router/terminal (routers C and D) provided on the default route determines if the packet is addressed thereto and if not, forwards it to the following router/terminal (S2, S3). Then, the destination terminal B receives the packet and on recognizing the packet as addressed thereto, processes the received packet as an egress system (S4, S5).

While forwarding the first packet, terminal A determines if it is preferable to forward the packet through the default route and if not preferable, forwards the following packets through the default route, as with the first packet (S6, S7). If preferable, terminal A sends an SP Request message to the destination through the default route (S8). The message is sent to terminal B through the default route (S9, S10) in the same way as the first packet. When terminal B recognizes that the message is addressed thereto, it requests the network to set a shortcut path (S11, S12). The network sets a shortcut path between ingress system terminal A and egress system terminal B (S13, S14). Once a shortcut path is set, the following packets are forwarded between the ingress system and the egress system through the shortcut path (S15, S16).

Next, an example is explained based on FIG. 5, in which the egress system requests to set a shortcut path instead of the ingress system. As in above FIG. 4, steps S1–S5, the first packet is forwarded from terminal A to terminal B through the default route (S21–S25). Terminal A determines if it is preferable to set a shortcut path (S26). On recognizing it as not preferable in this case, terminal A continues to transmit following packets through the default route (S27).

The above determination is conducted not only by the ingress system, but by a transit system and a egress system (not shown for the transit system). If the transit system and egress system determines that a shortcut path need not be set, they receive following packets through the default route as with the first packet (S28, S29). However, if terminal B determines it to be preferable to set a shortcut path, the SP Request message is sent from the egress system terminal B to the ingress system (S28, S30). Thus, the message is sent in the opposite direction though the default route. When the transit system recognizes that the message is not addressed thereto, it passes the message to the ingress system through the default route (S31, S32).

In this example, ingress system terminal A recognizes the message is addressed thereto and requests the network to set a shortcut path (S33, S34). After a shortcut path is set, the following packets are forwarded through the shortcut path.

Next, an example is explained based on FIG. 6, in which a transit system requests to set a shortcut path instead of the ingress and egress systems. The first packet is forwarded to the egress system through the default route (S41–S45). It is assumed here that both ingress and egress systems have determined it unnecessary to set a shortcut path, whose determination process is omitted in FIG. 6 and instead, at least one of the transit systems has determined it necessary.

Since the transit system's determining it necessary to set a shortcut path is parallel to bypassing the transit system itself, it is useless to provide an end of the shortcut path at the transit system itself. Thus, instead of sending the SP Request message, the transit system sends a message requesting to initiate to set a shortcut path (hereinafter called SP Initiation message) either to the ingress or egress system through the default route. FIG. 6 shows an example in which the SP Initiation message is sent to the ingress system (S46, S47).

On receiving the SP Initiation message, the ingress system sends the SP Request message to the exit system through the default route (S48). The succeeding operations (S48–S56) are the same as in FIG. 4 steps S8–S16 and are not explained. In case the transit system sends the SP Initiation message to the egress system, the egress system sends the SP Request message to the ingress system. The operations are the same as in FIG. 5 steps S30–S38 and are not explained.

As explained above, when the router or terminal which is either an ingress, egress or transit system, determines it necessary to forward the packet flow through a path bypassing the default route, a shortcut path is set in the NBMA network for connecting the ingress system directly to the egress system. As a result, the router etc. on the default route is released from the packet-relay processing and therefore, the packet tranfer is sped up.

The ingress or egress system sends the SP Request message including its network address through the default route to the opposite system to have the opposite system set the shortcut path. Therefore, there in no need to have an address resolution server and the like for setting a shortcut path. Further, when the transit system determines it preferable to set a shortcut path, it requests either the ingress system or the egress system to initiate to set a shortcut path and have the either send the SP Request message and therefore, a shortcut path can be set without the need of an address resolution server and the like.

Next, the operations of the end system of the present invention is explained based on FIG. 7. End systems 10a–10d shown in FIG. 7 correspond to the router or the terminal directly connected to the communication network. For easy understanding, an example is explained in which assuming that end systems 10a and 10b are terminals and end systems 10c and 10d are routers, a packet is forwarded from end system 10a to end system 10b.

First, a packet (PKT) forwarding means 14 of end system 10a transmits a packet to a predetermined default route 4a. In end system 10c, on recognizing the packet received from the default route 4a as not addressed thereto, a packet forwarding means 14 forwards the packet to the following end system (e.g., end system 10d) provided on the default route 4c.

In end system 1d, on recognizing the received packet as addressed to end system (terminal) 10b, which is directly connected to subnetwork 3b to which end system 10d is also connected, packet forwarding means 14 forwards the packet to default route path 4b leading to end system 10b.

In end system 10b, packet forwarding means 14 receives the packet and a packet processing means (not shown in FIG. 7) processes the packet. Hereinafter, end system 10a, end system 10b and both end systems 10c, 10d are called ingress, egress and transit systems respectively, from their locations on the default route through which the packet flow is forwarded.

Flow determination means 11 of each end system examines the type of the packet flow being transmitted/received and determines whether it is preferable to forward the packet flow through a route bypassing the default route. Here, it is assumed that in end system (ingress system) 10a, flow determination means 11 has determined it as preferable to forward the packet flow through a route bypassing the default route. The means 11 instructs SP setting means 12 to set a shortcut path. As instructed, shortcut path setting means 12 sends to default route 4a, the SP Request message including the network address and high-layer protocol address of end system 10a, requesting the network 2 to set a shortcut path leading to end system 10a.

In end system 10c, the message received from default route 4a is passed to shortcut path setting means 12. When recognizing the message as not addressed thereto, the means 12 forwards the message to the following default router through packet forwarding means 14. In the same way, end system 10d forwards the SP Request message to end system 10b through default route 4b.

In end system 10b, on recognizing the message as addressed thereto, SP setting means 12 determines end system 10b to be the egress system. Shortcut path setting means 12 validates the network address and the higher-layer protocol address included in the SP Request message. Since a shortcut path leading to the ingress system can be set if the network address is valid, SP setting means 12 passes the address data to network connection means 13 and instructs it to set a shortcut path. As instructed, network connection means 13 requests the network 2 to set a shortcut path leading to the ingress system by using a signal path 6b. When a shortcut path is set, communication network 2 informs both end systems 10a and 10b of that effect and thereafter, both end systems' packet forwarding means 14 transmit/receive packet flows through the shortcut path.

The shortcut path consists actually of three paths as shown in FIG. 7: a path 5a between end system 10a and network 2, a path 5 within network 2 and a path 5b between network 2 and end system 10b; however, unless otherwise indicated, path 5 includes paths 5a and 5b. Prior to forwarding packets, shortcut path setting means 12 of end system 10b returns a reply message (called SP Reply message) including its network address and high-layer protocol address, to end system 10a through the shortcut path.

The above operations of the end system correspond to those realizing the packet transfer method explained with FIG. 4. The operations of the end system realizing the method explained with FIGS. 5 and 6 are the same as explained above. As is apparent from the explanation above, the same functional unit of the end system realizes shortcut path setting, whatever the end system may be, an ingress, exit or transit system. To set a shortcut path, the end system need only send and receive the aforesaid messages through the default route and therefore, individual end systems can operate independently. That is, the end system of the present invention allows the network to be configured and expanded with ease, since it is constructed in an autonomous and decentralized control method unlike the server/client configuration which need store system information that is difficult to manage or provide a specific route for exchanging control information. It also provides the same effect as in the packet transfer method of the present invention explained with FIGS. 3–6.

Figure 8:
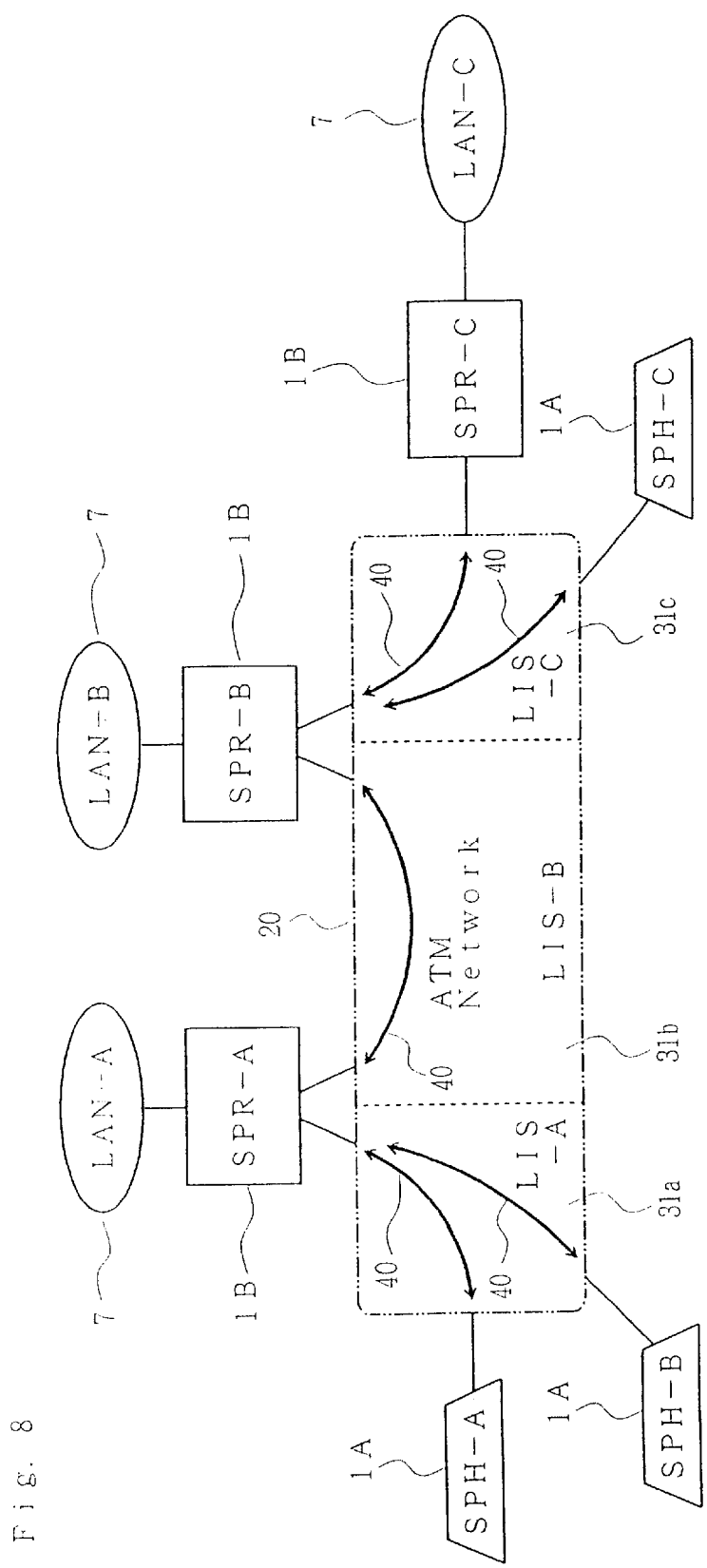
FIG. 8 shows an ATM network configuration to which the present invention is applied.
Figure 22:
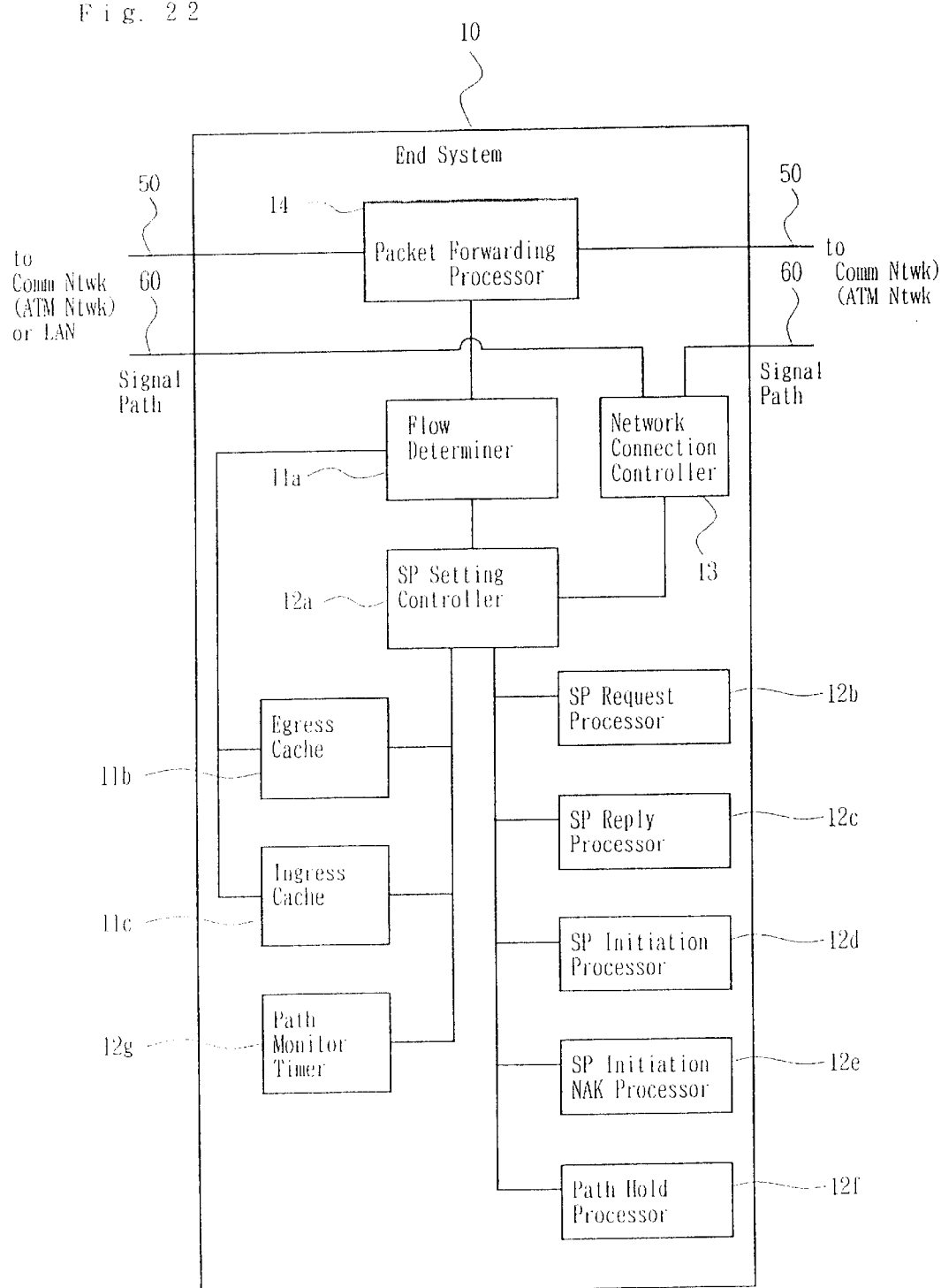
FIG. 22 shows the configuration of the end system of the present invenion.

FIG. 8 shows an ATM network configuration to which the present invention is applied. FIGS. 9A–9B and 11A–15B illustrate the operations of the packet transfer method of the present invention. FIGS. 16A–16B and 17A–17B show a basic format of the shortcut path setting messages of the present invention. FIGS. 18A and 18B show a basic configuration of the egress and ingress caches respectively, of the present invention. FIG. 19 illustrates the filter specification. FIGS. 20A–20D and 21A–21D illustrate the contents of the egress and ingress caches. FIG. 22 shows the configuration of the end system of the present invention.

An example is explained below based on FIG. 8, assuming that the packet transfer method of the present invention is applied to an ATM network and the TCP/IP is used as a high-layer protocol for forwarding a packet through the ATM network.

ATM network 20 includes subnetworks 31a, 31b and 31c. The logical subnetwork in which the IP is used is often called a Logical IP Subnetwork (abbreviated to LIS) and hereinafter, subnetworks 31a, 31b and 31c are respectively called LIS-A SPH-A, B) and ATM router 1B (abbreviated to SPR-A, B, C) perform the packet transfer according to the present invention. The ATM terminal 1A is connected directly to the ATM network 20, unlike terminals which are accommodated in the legacy LAN (local area network) 7, for example. In other words, The ATM terminal 1A and ATM router 1B shown in FIG. 8 are the end systems connected directly to the ATM network 20, corresponding to the router/terminals 1a–1d shown in FIG. 3.

When a packet is forwarded over one or more LISs 31 constituting ATM network 20, the packet is forwarded through a router (e.g., default routers SPR-A and SPR-B) provided on the default route. Default route path 40 is set between the ATM terminal (SPH-A, B) and a corresponding default router SPR-A. Also default route path 40 is set between the default routers SPR-A and SPR-B. Under an network environment using the TCP/IP, setting the default route path is indispensable whatever lowerlayer protocol is used. The first feature of the present invention is that the packet transfer operation is completed only by setting the default route.

Figure 9A:
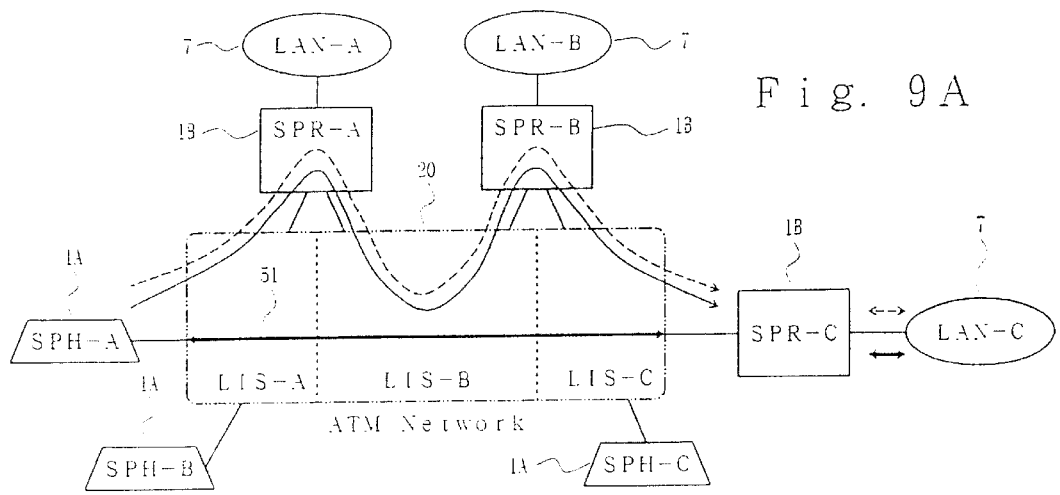
FIGS. 9A–9B illustrate the operations of the packet transfer method.
Figure 9B:
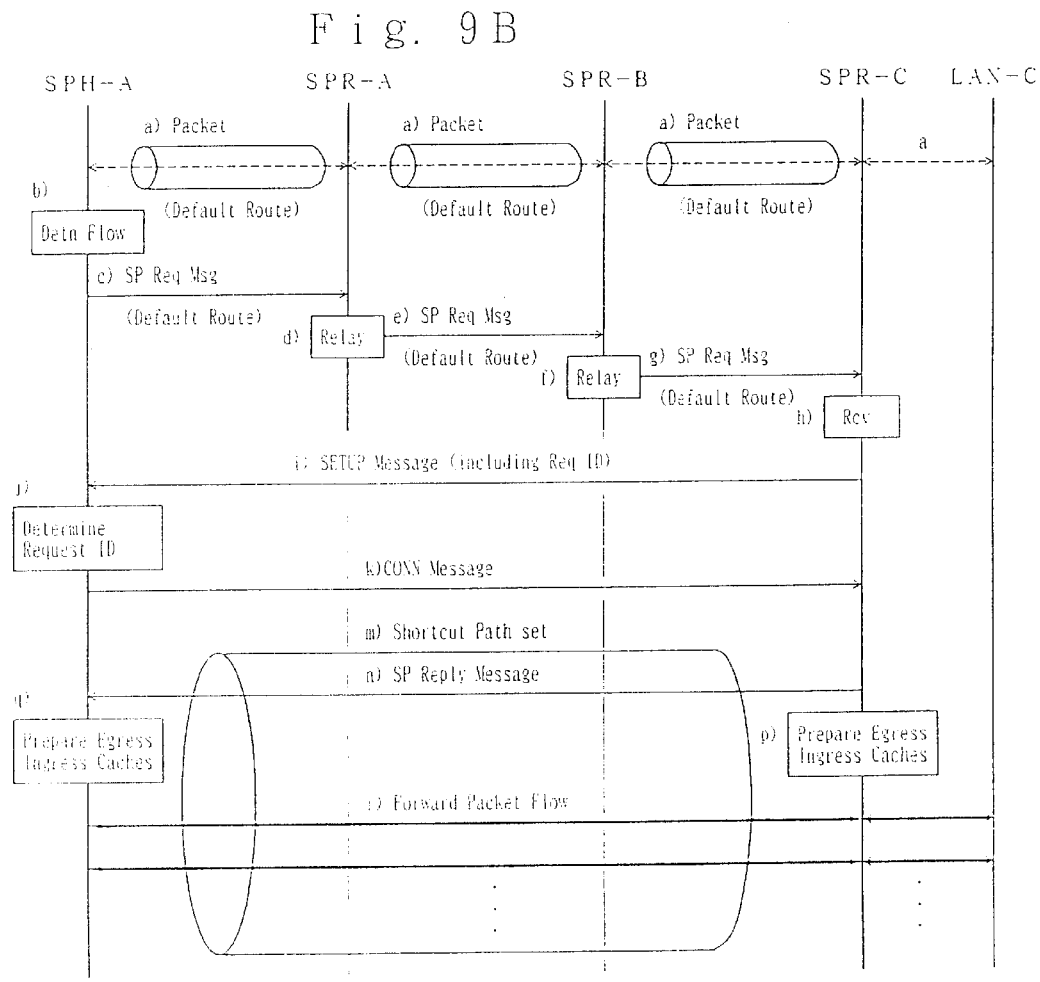

A packet tranfer is usually conducted between a terminal in a legacy LAN and a terminal in another legacy LAN. However, for easy understanding, an example is explained in which a packet is forwarded from an ATM terminal SPH-A connected to LIS-A to a terminal (not shown in FIG. 8) connected to a legacy LAN-C through an ATM router SPR-C which is connected to LIS-C and also to LAN-C (hereinafter the terminal connected to LAN-C is called LAN-C). Therefore, SPH-A is an ingress system; SPR-C is an egress system; and SPR-A and SPR-B are transit systems.
Packet Transfer Method of First Embodiment of Present Invention FIGS. 9A and 9B show the packet or message forwarding route and sequence, respectively of the packet transfer method of the first embodiment. Here, an example is shown in which the ingress system (SPHA) determines that a shortcut path need be set and the egress system (SPR-C) requests the ATM network 20 to set a shortcut path, in the network configuration shown in FIG. 8.

In FIG. 9A, a packet flow is forwarded from SPH-A to the legacy LAN-C through a shortcut path 51 set between SPH-A and SPR-C. The operation is detailed based on FIG. 9B. Hereinafter, references a, b, c, . . . appearing in the following explanation of first to sixth embodiment correspond to steps a), b), c), . . . shown in FIGS. 9B and 11B–15B.

(1) When detecting a packet addressed to the destination LAN-C, the ingress system (SPH-A) first forwards the packet to SPR-A which is a default router of LIS-A. The packet is usually transferred to the destination through the default route. That is, as shown in FIG. 9A by the dotted line, the packet is transferred from SPH-A to SPR-C through SPR-A and SPR-B, i.e., passing ATM routers 1B in a hop-by-hop fashion. If the ingress system is capable of buffering incoming packets before the shortcut path is set, it may forward the buffered packets through the shortcut path after it is set, not through the default route.

(2) The ingress system (SPH-A) examines the header and the port number of the packet being forwarded in above step (1) and based on the examining, determines whether to forward the packet flow through a short cut, i.e., to set a shortcut path (step b). That is, when detecting a packet flow of an application (e.g., FTP and FTTP) which transfers a large amount of data, the ingress system (SPH-A) determines to set a short cut and sends a Shortcut Path (abbreviated to SP) Request message to the default route (step c).

An end system sends. the SP Request message to have a shortcut path leading thereto set and to report the network address (ATM address here) and high-layer protocol address (IP address here) and filter specification (later-explained) for indicating the specifications of the packet flow the end system can receive through the shortcut path. The message is sent to the opposite device from either of the end systems at both ends of the shortcut path to be set, i.e., from either the ingress system or the egress system.

FIG. 16A shows a format and definition of the SP Request message. Field 1 identifies a communication network (ATM network 20 here, one single ATM network is shown in FIG. 8; however, there may be plural ones). Specified in field 2 is a message type identifier code, e.g., 0 (zero) for the SP Request message. Specified in field 3 is a message identifier code, for use in requesting a shortcut path and also in replying to the request with the same code (hereinafter called request ID). Specified in field 4 is an address defined in the communication network (ATM address here).

Specified in field 5 is the length of the ATM address by byte, for example. Specified in field 6 is the network address of the shortcut-path requesting terminal, i.e., the ATM address of SPH-A, which sends the SP Request message in this example. Specified in field 7 is the protocol address type of the shortcut-path requesting terminal, i.e., the IP address used by SPH-A. Specified in field 8 is the length of the protocol address of the shortcut-path requesting terminal (SPH-A IP host address length here). Specified in field 8 is the protocol address of the shortcut-path requesting terminal (SPH-A IP address here).

Fields 10–12 relate to the destination of the message (i.e., a destination terminal within LAN-C). Specified in field 10 is the protocol address type (i.e., IP address type). Specified in field 11 is the length of the protocol address (i.e., IP address length). Specified in field 11 is the protocol address (i.e., IP host address of the destination terminal within LAN-C).

Specified in field 13 is an indication (called VC Sharing) to permit other packet flow to share a VC (Virtual Circuit). Specified in fields 14–17 are the "filter specification", which indicates the specifications of the packet flow the message-sending end system can receive through the shortcut path (detailed later). In this example, the SP Request message having the aforesaid contents specified is sent from SPH-A to the default route. Since the message might be lost accidentally in the network, it is preferable to transmit the message repeatedly at a constant interval (e.g., every 30 seconds) until the shortcut path is set.

(3) The SP Request message is first received by SPR-A. SPR-A examines the protocol address of the message destination which is specified in the message field 12 (see FIG. 16A) and determines whether SPR-A is an egress system or a transit system. The determination is conducted based on whether the protocol address exists in other network (e.g., LAN-A for SPR-A) outside the ATM network 20 which has received the SP Request message or in another subnetwork (e.g., LIS-B or other) inside the ATM network 20. Since the destination IP address indicates a terminal within LAN-C in the example, SPR-A recognizes itself as a transit system and that the destination of the packet flow is SPR-B which exists in the same ATM network 20 (steps d, e) and thus, forwards the received SP Request message to SPR-B through the default route. In the above determination, actually a terminal is not identified by the destination IP address but any terminal within LAN-C is recognized by the high-order digits called a network address in the IP address.

(4) SPR-B handles the SP Request message in the same way and forwards the message to SPR-C (steps f, g).

(5) SPR-C handles the SP request message in the same way and determines that the destination (LAN-C) is outside the ATM network 20 and that SPRC itself is an egress system (step h) based on the network address of the IP address.

(6) Thereafter, SPR-C processes on the packet received from the default route (see above step (1)) and based on the message-sender's ATM address (SPH-A ATM address here) specified in the SP Request message (see above step (5)), requests the ATM network 20 to set a path (VC) leading to the end system having the ATM address (i.e., the ingress system SPH-A). The above path-setting request is conducted by sending to the ATM network 20, a call-setting request (SETUP) message (used for establishing connection by an ATM exchange) with the request ID which was specified in the SP Request message field 3 (see FIG. 16A) added thereto as an end-to-end information element (step i). The message is then sent to the opposite SPH-A through the ATM network 20.

(7) On receiving the SETUP message, the ingress system SPH-A, which originally sent the SP Request message, examines the request ID included in the end-to-end information element. If the request ID agrees to what was originally specified, the ingress system accepts the VC setting request and returns a CONNECT (abbreviated to CONN) message which is a reply to the SETUP message from the called party (steps j, k). Since it can determined by means of the request ID whether the thus-set path is intended, the ATM-network VC level security is attained. After the CONN message is sent through ATM network 20 to SPR-C which sent the SETUP message, a shortcut path is set between SPR-C and SPH-A. To set a shortcut path is to determine the VPI and VCI (abbreviated to VPI/VCI). Here, it is assumed that a shortcut path is set with the VPI/VCI specified as 0/100 (step m).

(8) When shortcut path 51 is set as shown in FIG. 9A, the egress system SPR-C sends an SP Reply message to the ingress system SPR-A through the newly-set shortcut path 51 (step n).

Thus, the last end system that received the SP Request message sets a shortcut path and returns the SP Reply message in reply to the SP Request message usually through the shortcut path. The SP Reply message includes the type of the packet flow (filter specification) which the SP-Reply-message sending end system can receive through the short-cut path, in addition to the network address (ATM address) and high-layer protocol address (IP address) of the end system.

FIG. 16B shows an example of the format and definition of the SP Reply message. The explanation follows with the field having the same definition as that for the SP Request message omitted. Specified in field 2 is a message type identifier code, e.g., "1" for the SP Reply message. Specified in field 3 is the same request ID as for the SP Request message. Fields 4–9 are for the SP-Reply-message sender (SPR-C here). Specified in field 6 (sender transmission address) is. the SPR-C ATM address. Specified in field 9 (sender protocol address) is the SPR-C IP host address. Fields 13 et seq. are explained later.

(9) The egress system SPR-C prepares output packet condition storage (hereinafter called egress cache, shown in FIG. 20C) based on the SPRequest-message sender's protocol address (SPH-A IP host address), transmission address (SPH-A ATM address) and filter specification, which have been specified in the received SP Request message. It also prepares input packet condition storage (hereinafter called ingress cache, shown in FIG. 20D) based on the filter specification specified in the replied SP Reply message.

The egress cache, ingress cache and filter specification are explained here. As explained above, the flow determination means of the ingress, egress and transit systems examines the packet flow being transmitted, received and relayed to determine whether to set a shortcut path for the packet flow. The means also examines the packet flow flowing through the thus-set shortcut path. For this purpose, the ingress and egress caches are provided, corresponding to the packet input to and output from the network (ATM network here) respectively, through the shortcut path. The ingress and egress caches are prepared based on the filter specification and transmission address data both included in the SP Request and Reply messages and on the attributes of the shortcut path. Based on the caches, each end system examines the packet flow passing the shortcut path to prevent an abnormal packet from flowing in and out.

FIGS. 18A and 18B show a basic configuration of the egress and ingress caches respectively, applied generally to the communication network.

FIG. 18A shows the configuration of the egress cache. Specified in egress cache field 1 is the filter specification for indicating the packet-flow specifications according to which the opposite device is requried to send the packet flow to the network (ATM network). Specified in fields 2 and 3 are the protocol address and the transmission address of the opposite device, for allowing to send only the packet flow addressed to the device having the specified address. Specified in field 4 is a port when the device with the egress cache has plural ports, for allowing to send only the packet flow input from the specified port. Specified in field 5 is a VPI/VCI number of a shortcut path for allowing to send only the packet flow specifying the VPI/VCI. Specified in field 6 is an indication whether to permit an another terminal's packet to share (or be multiplexed on)the shortcut path.

FIG. 18B shows the configuration of the ingress cache. Specified in field 1 is a port when the device having the ingress cache is provided with plural ports, for allowing to input a packet flow only from the specified port. Specified in field 2 is the VPI/VCI number of a shortcut path. Specified in field 3 is the flow specification.

The filter specification included in the SP Request and SP Reply messages indicates attributes of the packet flow handled on a shortcut path. FIG. 19 shows a part of the filter specification. The aforesaid ingress and egress cashes are prepared based on the attributes specified here and used to prevent an abnormal packet from flowing in and out by examining the packet flow passing the shortcut path referring to the specification.

The filter specification is specified by the type numbers each representing an attribute shown in FIG. 19. A single type number can specify plural attributes. For example, type 1 and type 2 each specify only the protocol address of a destination. Type 3 and type 4 each specify a combination of a packet sender's protocol address and a destination's protocol address. Type 5 specifies a combination of a protocol and a port number each for a sender and a destination. Any combination of a network address, host address, port number, sender and destination is a possibilty; however, FIG. 19 shows only a part of the attributes taken singly or in combination.

An example of the use of the filter specification is explained below referring to FIG. 19, in which type 1 and type 2 specify "destination network address" and "destination host address", respectively. As for the IP address, the "network address" is specified by high-order digits of the IP address, whereas the "host address" is specified by all the IP address digits. Thus, a LAN can be specified by the network address and a terminal within the LAN can be specified by the host address. Therefore, specifying type 1 in the filter specification allows any terminal within the specified LAN to use the shortcut path, whereas specifying type 2 does not allow a terminal not specified by the host address, to use the shortcut path, even if the terminal is within the specified LAN.

Resuming the explanation of SPR-C in FIG. 9A and 9B, the filter specification included in the SP Request message is detailed here. As explained above, SPR-C prepares the egress cache by using the information included in the SP Request message received from SPH-A. When sending the SP Request message, it is assumed here that SPH-A has specified only its host address in the filter specification. In the SP Request message shown in FIG. 16A, SPH-A specifies "1" in field 14 (No of filter specifications), "SPH-A IP host address" in field 17 (filter specification content), filter specification number (common to each system) in field 15 (filter specification number), and "SPH-A IP host address length" in field 16.

After sending the SP Reply message, the egress system SPR-C prepares the egress and ingress caches (FIG. 9B, step p). It prepares the egress cache referring to the SP Request message. Referring to the SP Request message shown in FIG. 16A, the information to be stored in the egress cache (FIG. 18A) is explained.

First, FIG. 16A field 17 contents (filter specification contents, i.e., SPH-A IP host address specified here) are transferred to FIG. 18A field 1 (filter specification content). FIG. 18A fields 2 and 3 stores therein the address of the device (SPH-A here) to which the specification is applied. Therefore, the "SP Request message sender's protocol address (SPH-A IP host address here) of FIG. 16A field 9 is stored in FIG. 18A field 2; and the "SP Request message sender's transmission address" (SPH-A ATM address here) of FIG. 16A field 6 is stored in FIG. 18A field 3.

The TCP/IP port number (e.g., "1") by which SPR-C transfers a packet is stored in FIG. 18A field 4 (port). The shortcut path VPI/VCI value (e.g., aforesaid 0/1001) is stored in FIG. 18A field 5 (VPI/VCI). The contents specified in FIG. 20A field 6, ("permissible" here) is stored in FIG. 18A field 6 (VC sharing).

In stead of preparing the egress cache after the SP Reply message is sent (FIG. 9, step p), it may be prepared by filling in the fields excluding the "VPI/VCI" when the SP Request message is received and thereafter by storing the "VPI/VCI" when the shortcut path is set. With the egress cache thus-prepared, the flow determination means of the egress system examines packet flows and sends to the shortcut path, only the packet flow conforming to the conditions specified in the cache.

Next, SPR-C prepares the ingress cache shown in FIG. 18B. First, SPR-C stores the TCP/IP port number (e.g., "1") in field 1 (port) and stores the shortcut path VPI/VCI value (e.g., "0/100") in field 2 (VPI/VCI). It also stores in field 3 (filter specification), the filter specification" which SPR-C itself specified in the SP Reply message. To forward through the shortcut path, only the packet flow addressed to LAN-C which is connected to SPR-C, for example, SPR-C need only specify "LAN-C IP network address" in field 17 (filter specification) of the SP Reply message and store the same "LAN-C IP network address" in the ingress cache field 3.

FIG. 20D shows the thus-prepared ingress cache. SPR-C passes only the packet (ATM cell) for which the VPI/VCI is 0/100, the LAN-C IP network address is specified, and the port number is "1".

(10) The ingress system prepares the egress and ingress caches shown in FIGS. 18A and 18B, respectively. It prepares the egress cache based on the information specified in the SP Reply message.

The filter specification content specified in FIG. 16B field 17 (e.g., aforesaid LAN-C IP network address) is stored in FIG. 18A field 1 (filter specification content). The SP-Reply-message sender's protocol address specified in FIG. 16B field 9 (e.g., SPR-C IP host address) is stored in FIG. 18A field 2. The transmission address specified in field 6 (e.g., SPR-C ATM address) is stored in FIG. 18A field 3. Also, the SPH-A TCP/IP port number, the shortcut path VPI/VCI (e.g.,"0/100") and the FIG. 16B field 13 content (e.g., permissible) are stored in FIG. 18A field 4 (port), field 5 (VPI/VCI) and field 6 (VC sharing), respectively. FIG. 20A shows the thus-prepared egress cache of SPH-A.

As for the ingress cache (see FIG. 18B), the TCP/IP port number (e. g., "1") and the VPI/VCI (e.g., "0/100") is stored in FIG. 18B field 1 (port) and field 2 (VPI/VCI), respectively. Also, the "filter specification content" which SPH-A specifies in the SP Request message (i.e., content specified in FIG. 16A field 17, e.g., SPH-A IP host address as in the foregoing example) is stored in FIG. 18B field 3 (filter specification).

(11) Thus, after the egress and ingress caches are prepared in the ingress and egress systems respectively, the packet flow is forwarded through the shortcut path (FIG. 9, step r). Each flow determination means of both systems perform a mapping operation to selectively transmit a packet flow to the shortcut path according to the egress cache and a filtering operation to selectively receive a packet flow according to the ingress cache, therefore achieving great security for the packet flow.

To summarize the first embodiment: since an end system (e.g., SPHA) requesting a shortcut path sets a VC by reporting the ATM address and using the request ID, a leak of the ATM address is prevented and ATM-level security is achieved. Since both end systems report the filter specification to each other and thereby control the packet flow passing the shortcut path, a shortcut path can be set for each application and the packet flow security is maintained for each application. Since each end system performs the above control operations individually, it can control system management (e.g., system security) independently, any failure therein can be localized and the failure can be prevented from influencing the entire network as is the case with a server.

Figure 10:
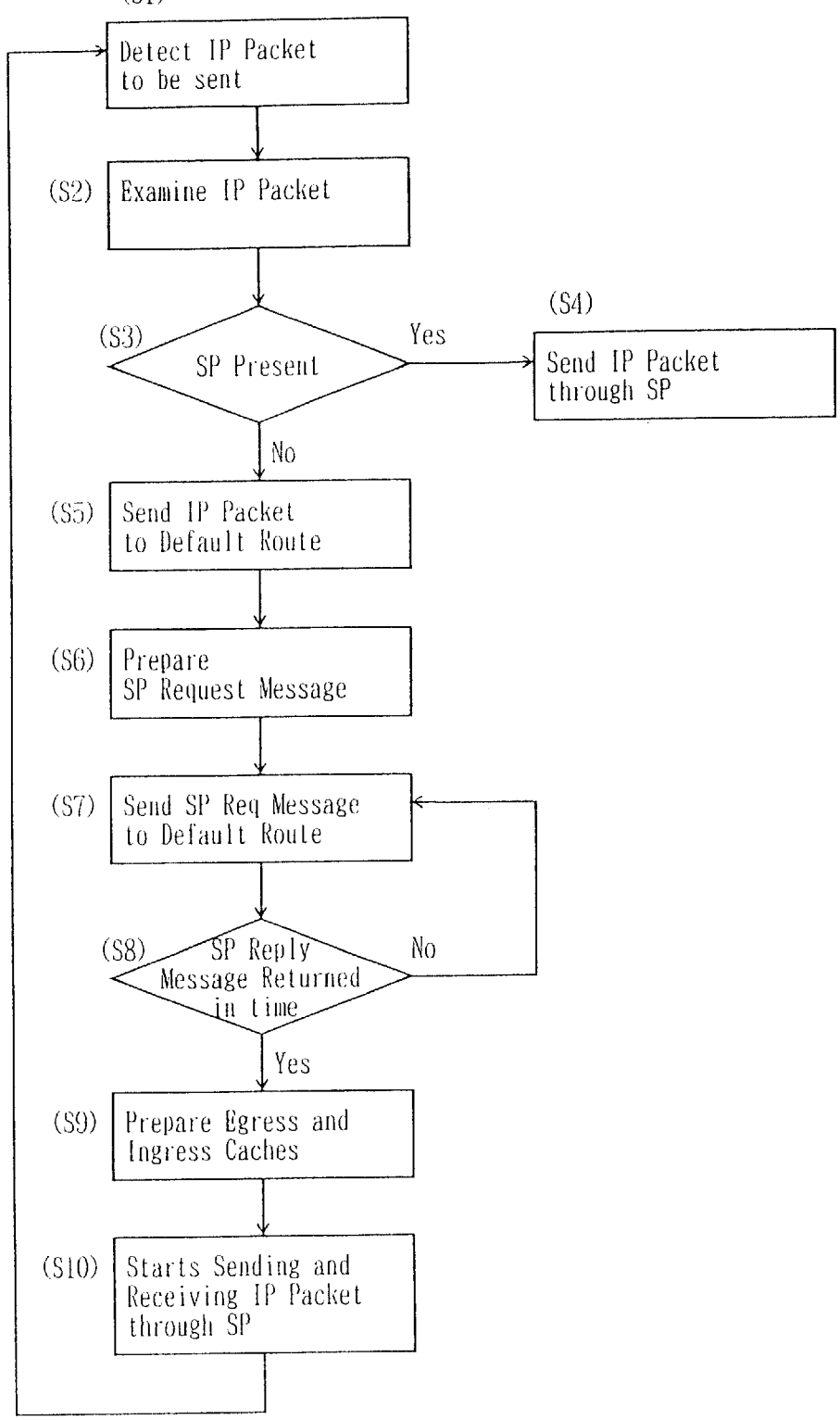
FIG. 10 is a flowchart illustrating a detailed operation of the ingress system.

Here, an operation of the ingress system is detailed referring to FIG. 10, a flowchart illustrating a detailed operation of the ingress system of the first embodiment.
(S1) The ingress system detects a packet (e.g., IP packet) to be sent from the ingress system itself or a legacy LAN.
(S2) Examines the IP address and port of the packet sender and those of the destination and determines whether to send the IP packet through the shortcut path.
(S3) Depending on the determination, checks the egress cache to see if the shortcut path has already been set.
(S4) If the shortcut path is set, sends the IP packet through the shortcut path,
(S5) Otherwise, sends the IP packet through the default route (or accumulates the IP packet so as to forward it through the shortcut path after it is set).
(S6) Prepares the SP Request message including the destination IP address and the information of the ingress system itself, i.e., the IP address, NBMA address and filter specification.
(S7) Sends the thus-prepared SP Request message to the default route.
(S8) Waits for the SP Reply message. If the message is not returned within a predetermined time, repeats the operation in step S7; otherwise, (S9) Prepares the egress cache based on the message replier's protocol, NBMA address and filter specification included in the SP Reply message. Also, prepares the ingress cache based on the filter specification included in the SP Request message the ingress system had sent.
(S10) Starts sending and receiving the IP packet through the shortcut path set by the steps S7 and S8.

Second embodiment of Packet Transfer Method of the Present Invention

Figure 11A:
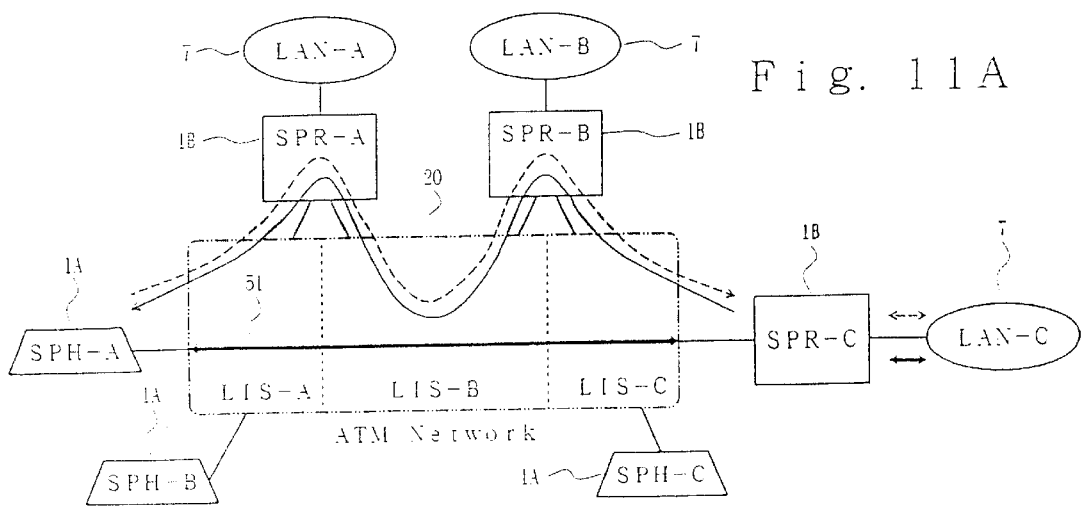
FIGS. 11A–11B, 12A–12B, 13A–13B, 14A–14B and 15A–15B illustrate the operations of the packet transfer method.
Figure 11B:
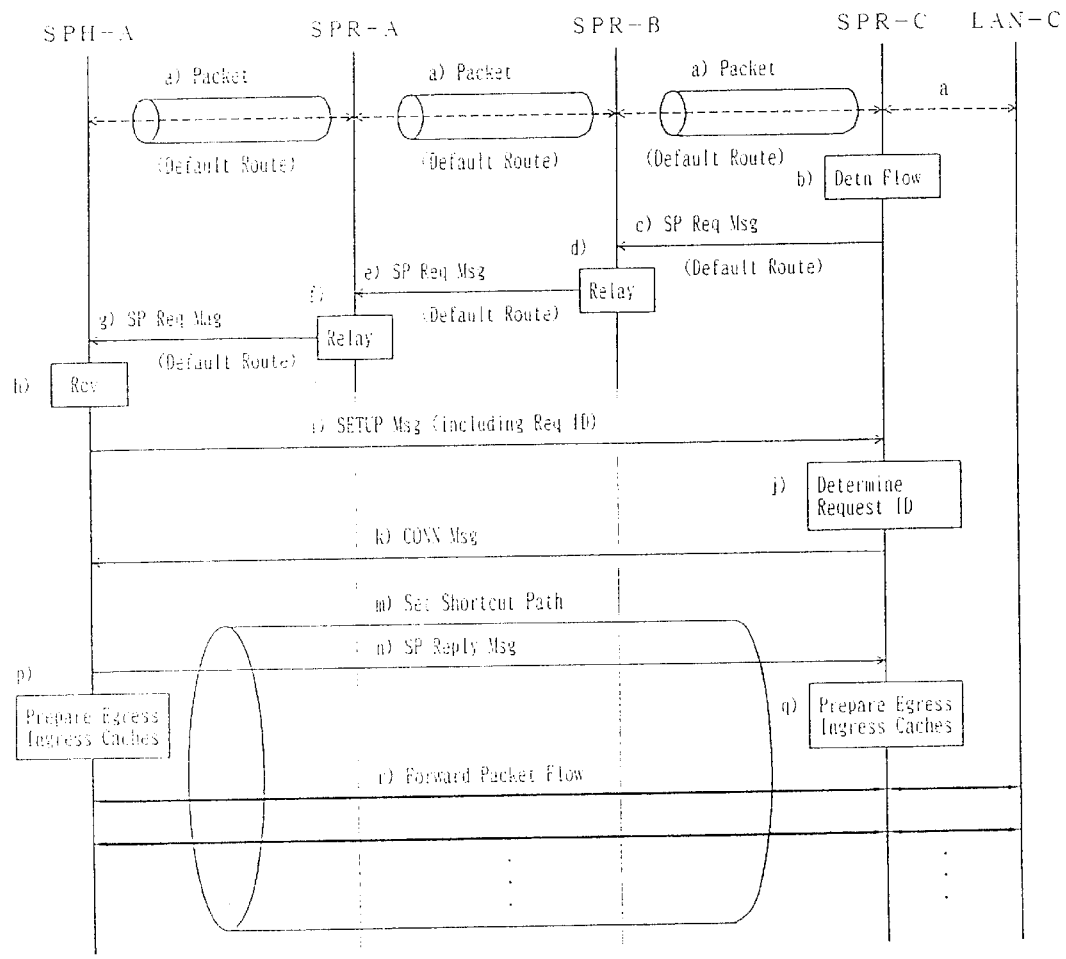

FIGS. 11A and 11B illustrate the second embodiment of the packet transfer method of the present invention. An example is shown in which the egress system SPR-C determines it preferable to set a shortcut path and the ingress system SPH-A requests ATM network 20 to set a shortcut path. In the same way as in the first embodiment, a shortcut path 51, which is set between SPH-A and SPR-C in ATM network 20, carries a packet flow to be forwarded from SPH-A to LAN-C, with SPR-A and SPR-B acting as transit systems. The second embodiment is explained based mainly on FIG. 11B, with a part similar to the first embodiment simplified, assuming that a packet flow is so specified as to be filtered in SPH-A by the host address and in SPR-C by the LAN-C network address.

(1) When detecting a packet addressed to LAN-C, the ingress system SPH-A first forwards the packet to SPR-A which is a default router of LIS-A. The packet is forwarded to the destination LAN-C through the default route (step a).
(2) While processing the received packet, SPR-C examines the header of the packet flow to determine whether it is preferable to pass the packet flow through the shortcut path (step b). When determining it as preferable, SPR-C sends the SP Request message to the default route, requesting to set a shortcut path (step c). The information as shown in FIG. 16A is specified In the SP Request message. In this example, the SPR-C ATM address is specified in "SP Request message sender's transmission address"; the SPR-C IP host address is specified in "SP Request message destination protocol address"; "permissible" is specified in "VC sharing"; "1" is specified in "number of filter specifications"; type 1 (i.e., destination network address shown in FIG. 19) is specified in "filter specification number"; and the LAN-C IP network address (a detail of type 1) is specified in "filter specification content". The SP Request message continues to be transmitted periodically.
(3) As in the first embodiment, the SP Request message is forwarded through the default route as far as the ingress system SPH-A, while the device on the way is examining the received message and determining whether the device itself is a transit system or a destination device for the message (steps d–h). The route of the message is shown in FIG. 11A by the thin solid line.
(4) When receiving the SP Request message from the default route, the ingress system SPH-A sends a SETUP message with the "request ID" added thereto, requesting ATM network 20 to set a shortcut path from SPH-A to the egress system SPR-C by using the "SPR-C ATM address" specified in "SP-Request-message sender's transmission address" of the SP Request message (step i).
(5) The SETUP message is sent to the egress system SPR-C. SPR-C validates the request ID in the received message and when recognizing the request ID as equal to what SPR-C has set in the SP Request message, sends a CONN message in reply to the SETUP message (steps j, k). Thereby, a shortcut path with the VPI/VCI being 0/100 is set between SPH-A and SPR-C (step m).

(6) When a shortcut path is set, SPH-A prepares an SP Reply message and sends the message to the egress system SPR-C through shortcut path 51 (step n). The information as shown in FIG. 16B is specified in the SP Reply message. That is, the SPH-A ATM address is specified in the "SPReply-message sender's transmission address"; the SPH-A IP host address is specified in the "SP-Reply-message sender's protocol address"; "permissible" is specified in "VC sharing"; "1" is specified in "number of filter specifications"; type 2 (i.e., destination host address shown in FIG. 19) is specified in "filter specification number"; and the SPH-A IP host address (a detail of type 2) is specified in "filter specification content".

(7) Then, the ingress system SPH-A prepares an egress cache as in FIG. 20A based on the SP-Request-message sender's protocol address, transmission address and filter specification content specified in the previously received SP Request message. It also prepares an ingress cache as shown in FIG. 20B based on the filter specification content specified in the SP Reply message which it has replied with (step p). The egress and ingress caches are prepared in the same process as in the first embodiment.

(8) When receiving the SP reply message, the egress system SPR-C prepares the egress cache as shown in FIG. 20C based on the SP-Replymessage sender's protocol address, transmission address and filter specification content specified in the SP Reply message. SPR-C also prepares the ingress cache as shown in FIG. 20D based on the filter specification content specified in the SP Request message which it has sent (step q). The egress and ingress caches are prepared in the same process as in the first embodiment.

(9) Thus, after the ingress and egress systems have prepared the egress and ingress caches, a packet flow is forwarded through the shortcut path (step r). Since the ingress system SPH-A and the egress system SPR-C map the packet flow on the shortcut path based on the ingress cache and filter the packet based on the egress cache, security is achieved for the packet flow.

To summarize the second embodiment, which is almost the same as the first embodiment except that in the second embodiment, the egress system determines it is preferable to set a shortcut path and sets a shortcut path according to the determination, whereas in the first embodiment, the ingress system does same. Therefore, if the second embodiment is applied to a case in which a server is accessed as in the aforesaid FTP and HTTP, e.g., with SPR-C and SPH-A being a server and a client terminal respectively, the SP Request message is not sent from the client terminal and thus, the ATM address of the client terminal is never sent to the ATM network. (The SP Reply message carrying the SPH-A ATM address is sent through the shortcut path as shown in FIG. 11B, but not through the default route which has a possibility to be monitored.) Since the ATM address information flowing in the ATM network is only that on server SPR-C, a reliable network can be constructed in terms of security.

Third Embodiment of Packet Transfer Method of the Present Invention

Figure 12A:
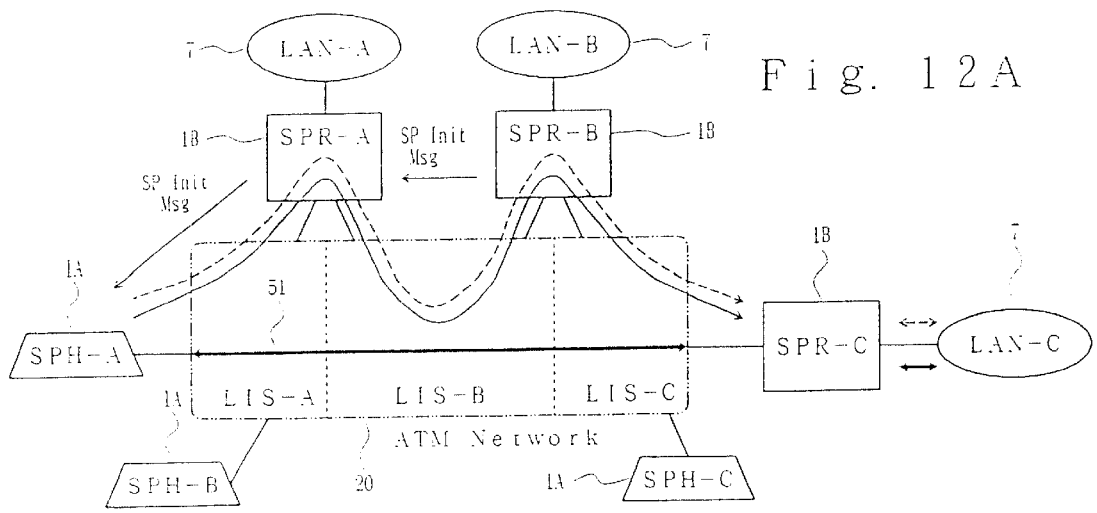
Figure 12B:
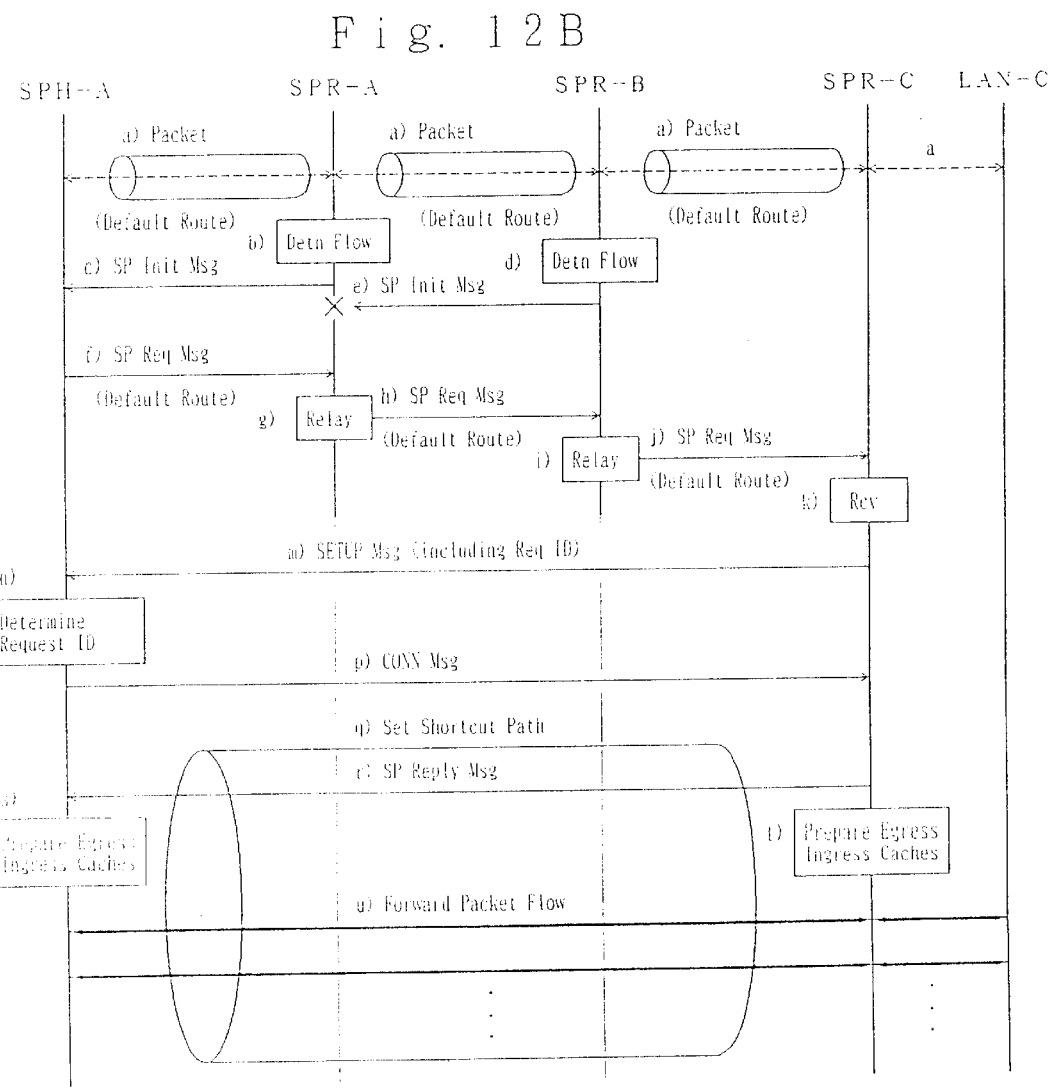

FIGS. 12A and 12B illustrate the third embodiment of the packet transfer method of the present invention. An example is shown in which a transit system (SPR-A and/or SPR-B) determines it preferable to set a shortcut path and requests the ingress system SPH-A (or egress system SPH-C) to set a shortcut path. The example is explained based on FIG. 12B with a part similar to the first and second embodiment simplified, in which both transit systems SPR-A and SPR-B determine it is preferable to set a shortcut path. It is assumed that a packet flow is so specified as to be filtered in SPH-A by the host address and in SPR-C by the LAN-C network address.

(1) When detecting a packet addressed to LAN-C, the ingress system SPH-A first forwards the packet to SPR-A which is a default router of LIS-A. As in the first and second embodiment, the packet is transmitted as far as the egress system SPR-C through the default route. SPR-C processes the received packet and forwards it to LAN-C (step a).

(2) The transit systems SPR-A and SPR-B monitor the packet while relaying it. When recognizing the packet flow forwarded in above step (1) as usual and determining it as preferable to forward it through a shortcut path, SPR-A and SPR-B send an SP Initiation message to the packet sender SPH-A or toward the packet destination, requesting to initiate to set a shortcut path (steps b–c, d–e). It is previously determined where to send the message, the packet flow sender or destination. It is assumed here to send the message to the packet sender SPH-A. The SP Initiation message is sent actually through the default route although otherwise shown in FIG. 12A. Here, information specified in the SP Initiation message is explained referring to FIG. 17B showing the configuration of the message.

Specified in field 1 is a number identifying a device within the communication network (or ATM network 20 here), as in the SP Request message (hereinafter the number is called the network address). Specified in field 2 is a message type code (e.g.,"4" for the SP Initiation message). Fields 3–6 are reserved (null specified).

Specified in fields 7–9, which are related to the SP-Initiation-message sender's protocol address, a protocol address type (IP address here), the address length and the IP host address of the transit system (SPR-A or SPR-B here) which sent the SP Initiation message, respectively. However, address data specified in fields 7–9 can be omitted (null specified) depending on the use of the later-explained fourth embodiment.

Specified in fields 10–12, which are related to the SP Initiation-message-destination's protocol address, are a protocol address type (IP address here), the address length and the protocol address of the ingress or egress system to which the SP Initiation message is sent (here, the ingress system SPH-A IP host address), respectively. Specified in fields 13–15 are a filter specification type (e.g., type 1, see FIG. 19), its length and a filter specification content (LAN-C IP network address here), respectively.

Respective transit systems provided on the default route determine independently whether to send the SP Initiation message. If a specific router in a position of a transit system has a traffic congestion even when the ingress or egress system has determined a shortcut path to be unnecessary, the router (or transit system) sends the message. The transit system continues to send the SP Initiation message periodically (e.g., at a 30-second period) until it recovers a steady state for the reasons that the traffic has moved from the default route to the now-set shortcut path, that the default route traffic resulting from the packet sender (e.g., SPH-A) has decreased, or that the traffic at other transit systems has decreased.

(3) There is a possibility of the SP Initiation message to be sent simultaneously by plural transit systems provided on the default route for the same packet flow. FIGS. 12A and 12B show an example in which the SP Initiation message is sent from both SPR-A and SPR-B (steps c, e). Sending all the SP Initiation messages to the packet sender SPH-A will increase uselessly the message processing load of SPH-A and the transit systems on the default route. To prevent this, the transit system is so constructed that when sending the SP Initiation message, it does not forward the SP Initiation message coming from the upstream to the downstream. FIG. 12B shows an example in which the SP Initiation message (step e) sent from SPR-B is blocked by SPR-A and not sent to SPH-A.

(4) On receiving the SP Initiation message, the ingress system SPH-A sends the SP Request message to the egress system SPR-C (step f). Since the following sequence is the same as in FIG. 9B, explanation is omitted. In case the SP Initiation message is sent to the egress system, the egress system sends the SP Request message and the following sequence is the same as in FIG. 11B.

To summarize the third embodiment, a transit system (generally a router) can request to set a shortcut path. There may be an application in which communication between the end systems is designed not to use a shortcut path unless the necessity arises. Such application includes a case which intends security by not sending the ATM address to the network, which address is required to set the shortcut path, and a case which has little resources for use at an ATM network level and majority of the resources are allocated to the default route. In those cases, it will be beneficial to send traffics with a security problem through the default route and to shift the traffics without the problem gradually to the shortcut path so as to distribute the traffic load.

Fourth Embodiment of Packet Transfer Method of the Present Invention

Figure 13A:
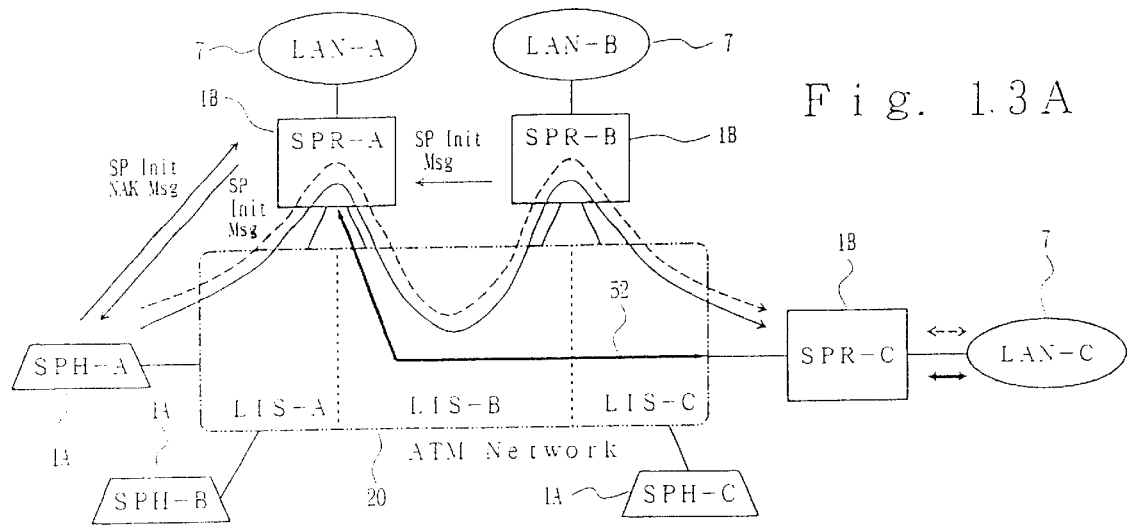
Figure 13B:
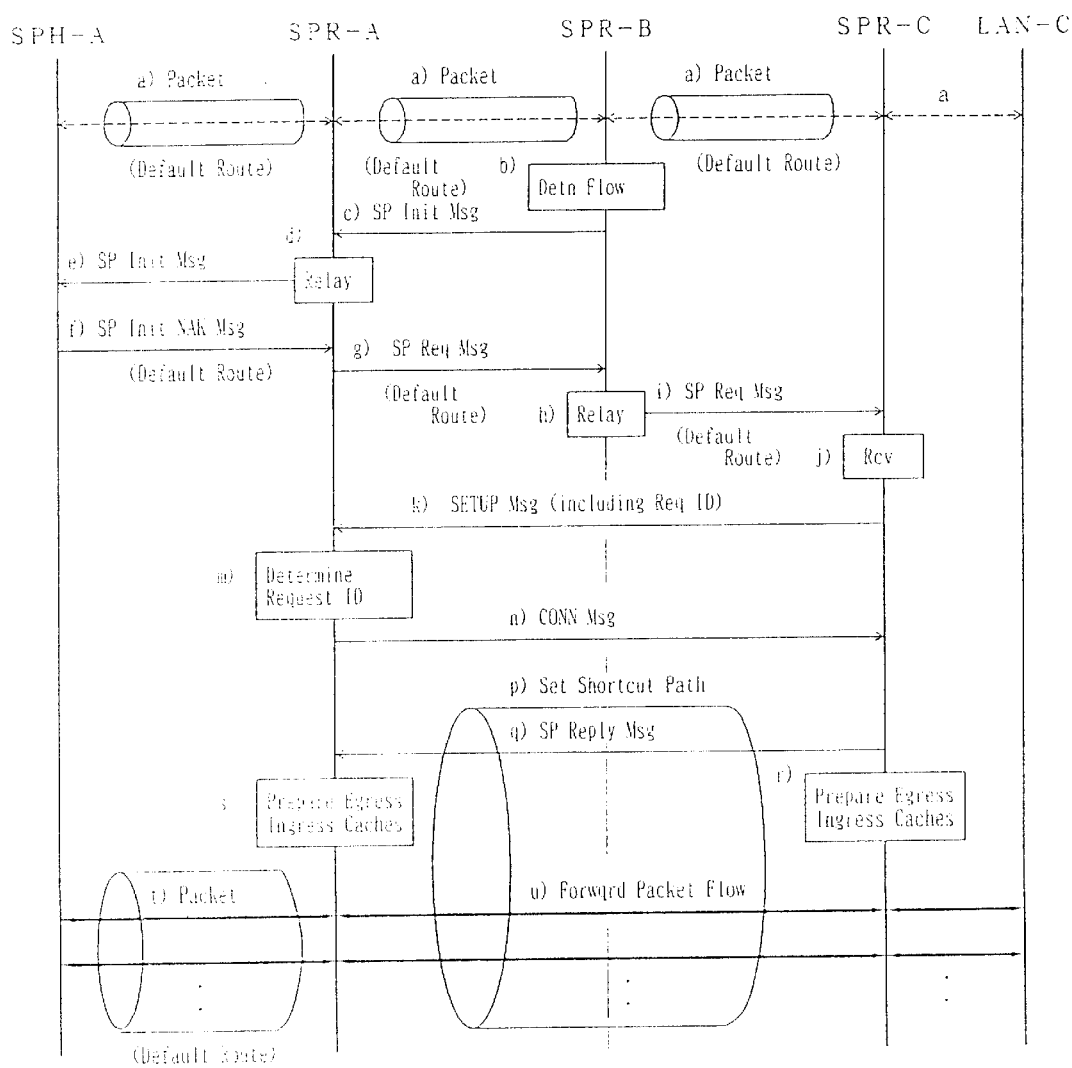

FIGS. 13A and 13B illustrate the fourth embodiment of the packet transfer method of the present invention. An example is shown here in which the ingress system (or egress system) which has received the SP Initiation message from a transit system as in the third embodiment, is unable to reply to the message for security reasons, for example. In the example, SPH-A refuses an SPR-B request to initiate setting a shortcut path (SP Initiation message) for a packet flow addressed from SPH-A to LAN-C. The explanation follows based mainly on FIG. 13B with a part similar to the preceding embodiment simplified. It is assumed that a packet flow is so specified as to be filtered in SPH-A by the host address and in SPR-C by the LAN-C network address.

(1) On detecting a packet to be sent to LAN-C, the ingress system SPH-A forwards the packet to SPR-A. The packet is forwarded to the egress system SPR-C through the default route. SPR-C processes the received packet and forwards it to the destination LAN-C (step a).

(2) Transit systems SPR-A and SPR-B monitor the traffic being relayed therethrough. It is assumed here that SPR-B has determined to forward the packet flow through a shortcut path and sent the SP Initiation message to the packet sender SPH-A (steps b, c). The message is relayed by SPR-A and sent to SPH-A (steps d, e).

(3) It is assumed here that it is not desirable for the message-received SPH-A to have a shortcut path set thereto for a security reason or other. Then, SPH-A prepares the SP Initiation NAK message and sends the message to an end system provided on the default route selected based on a certain selection criterion.

The destination of the SP Initiation NAK message is a proxy transit system which initiates shortcut-path-setting processing in place of an end system (here ingress system SPH-A) which has received the SP Initiation message. Generally, the destination is SPR-A which is the default router for the ingress system SPH-A, because a shortcut path set by SPR-A in place of the ingress system can cover a larger part of the ATM network. However, it is not necessarily preferable to set a shortcut path to a default router in view of security. Therefore, it is desirable to prepare a table etc. having a selection criterion for selecting an appropriate proxy transit system in view of the position of the SP-Initiation-NAK-message sender (specified in the message) within the network. The sender address need not be specified in the SP Initiation NAK message if it is predetermined to always select a default router.

The information to be specified in the SP Initiation NAK message is explained referring to FIG. 17B. Specified in field 1 is a network identification number as in the aforesaid examples. Specified in field 2 is a code (e.g., "5") representing the SP Initiation NAK message. Fields 3–9 are reserved. Specified in fields 10–12, which are related to the SP-Initiation-NAK-message destination's protocol address, are the SPR-A IP address (when the default router SPR-A is specified as the destination), the address length and the SPR-A IP host address, respectively. The SP Initiation NAK message with the fields thus-specified is sent to the default router SPR-A (step f).

(4) On receiving the SP Initiation NAK message from the default route, SPR-A sends the SP Request message toward the egress system in place of SPH-A (step g). The SPR-A ATM address is specified for the SP-Request-message sender's transmission address (see FIG. 16A, field 6).

(5) The SP Request message is relayed by SPR-B and received by SPR-C (steps h-j). On receiving the message, SPR-C requests the ATM network 20 to set a shortcut path leading to the transit system SPR-A, not to SPH-A in this case.

(6) The operational sequence taken hereinafter between SPH-A and SPR-C is the same as that shown in FIG. 9B (steps k–s). As a result, the shortcut path 52 is set as shown in FIG. 13A. When the packet flow is forwarded from SPH-A to SPR-C, SPR-A relays the packet flow through the default route between SPH-A and SPR-A, and through the shortcut path between SPR-A and SPR-C (steps t, u).

To summarize the fourth embodiment, the ingress system (or egress system) sends the SP Initiation NAK message, a system other than the ingress system (i.e., proxy system) stands proxy therefor in setting a shortcut path and the proxy system relays the packet flow through the default route and the shortcut path. In this embodiment, since the ingress system sends the SP Initiation NAK message without need to send its network address (e.g., ATM address) to the default route, the function to set a shortcut path can be represented collectively by a router of a specific subnetwork (e.g., SPR-C). Therefore, making the best use of this feature is effective in managing and controlling the security intensively.

Fifth Embodiment of Packet Transfer Method of the Present Invention

Figure 14A:
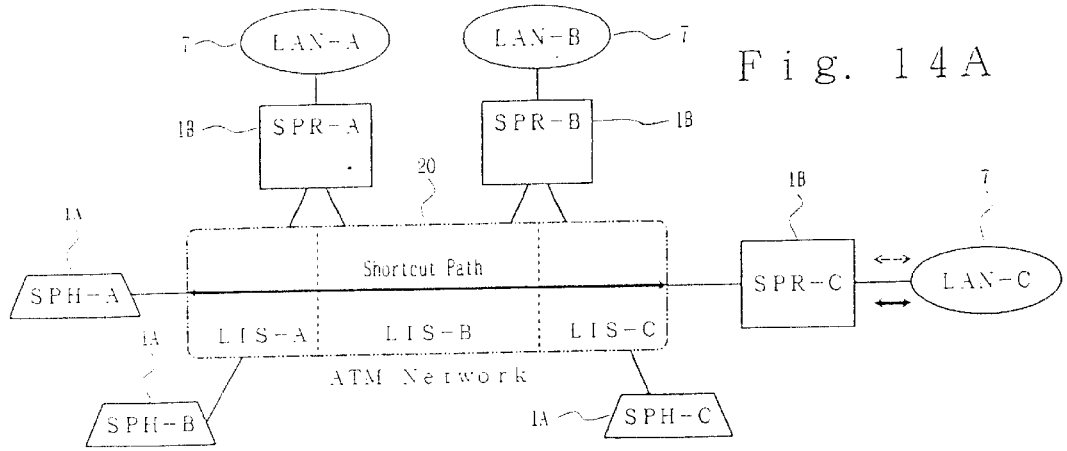
Figure 14B:
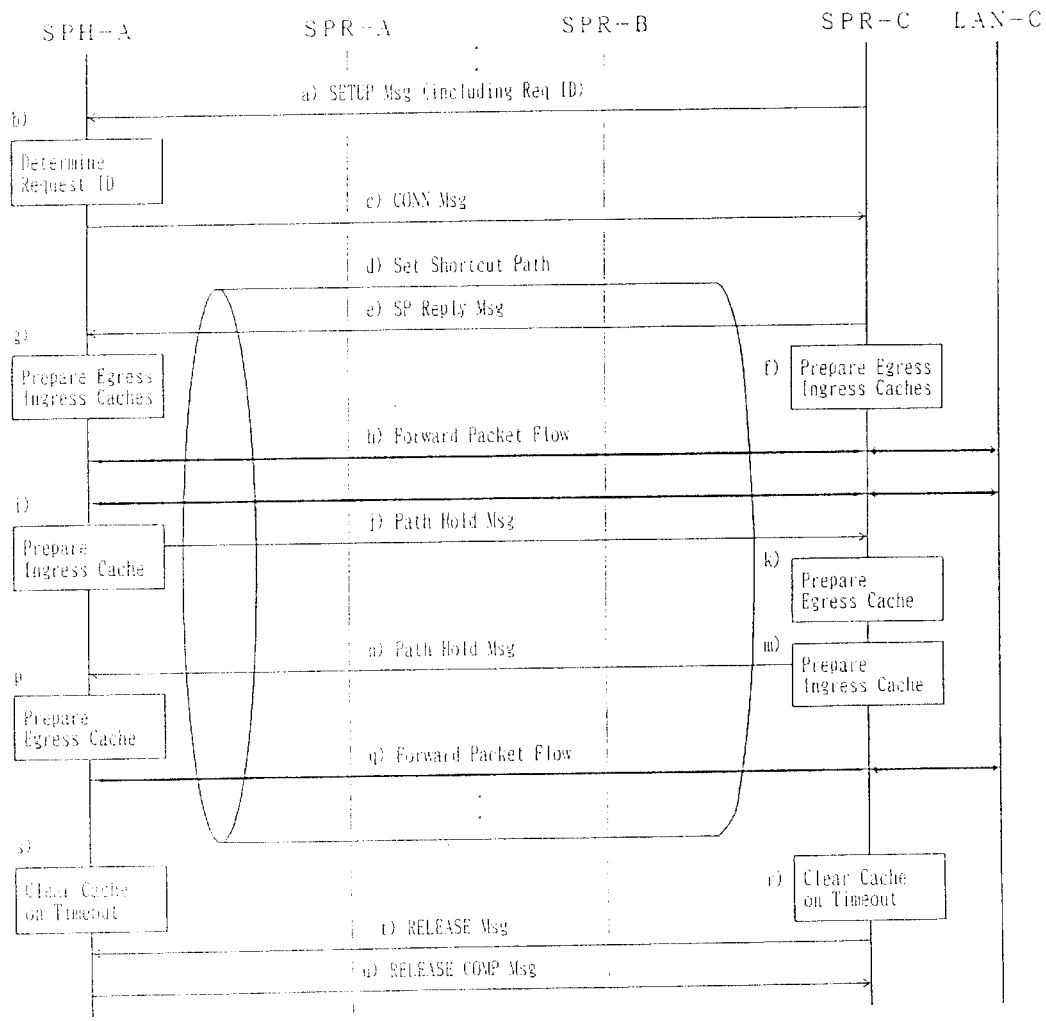

FIGS. 14A and 14B illustrate the packet transfer method of the fifth embodiment of the present invention, particularly the method to hold and disconnect the shortcut path set in the first to fourth embodiment. Since a method to hold and disconnect the once-set shortcut path is common to the first to fourth embodiment though they differ in the way to set a shortcut path, The method is explained based on the shortcut path set in the first embodiment. It is assumed here as in the first embodiment that the packet flow is so specified as to be filtered in SPH-A by the host address and in SPR-C by the LAN-C network address.

(1) FIG. 14B illustrates the operational sequence starting with sending the SETUP message for requesting the ATM network 20 to set a shortcut path. The sequence therefrom until a packet flow is forwarded through the thus-set shortcut path (steps a–h) is the same as in the first embodiment (FIG. 9B, steps i–r). Thus, a packet flow is being forwarded between SPH-A and SPR-C through thus-set shortcut path 51.

(2) While the ingress system SPH-A and egress system SPR-C which are located at both ends of shortcut path 51 are transmitting and receiving the packet flow through path 51, they each transmits the Cache Update message to shortcut path 51 e.g., at 3-minute period, so as to request the opposite end system to refresh its egress cache. SPH-A refreshes its ingress cache and thereafter transmits the Cache Update message to SPR-C (steps i, j). Also, SPR-C refreshes its ingress cache and thereafter transmits the Cache Update message to SPH-A (steps m, n). The Cache Update message continues to be sent periodically as long as there exists packet data to be forwarded. The Cache Update message is detailed below referring to FIG. 17C, which shows the basic configuration of the Cache Update message. Specified in field 1 is the same network identification number as explained above. Specified in field 2 is the message type identification code, i.e., "2" for the Cache Update message. Specified in field 3 is the same request ID as explained above. Since the contents specified in fields 4 et seq.are the same as explained above, details are explained corresponding to the device.

SPH-A specifies (in step j) the following in the Cache Update message fields (see FIG. 17C): "permissible" in field 4 (VC sharing); a value used for the first embodiment (i.e., "1") in field 5 (number of filter specifications); "type 1" (see FIG. 19) in field 6 (filter specification number); "SPH-A IP host address" in field 8 (filter specification content); and the length of "SPH-A IP host address" in field 7. That is, the same contents are specified in the Cache Update message as in the SP Request message explained in the first embodiment.

On the other hand, SPR-C specifies (step n) the following in the Cache Update message fields (see FIG. 17C): "permissible" in field 4 (VC sharing); "1" in field 5 (number of filter specifications); "type 1" in field 6 (filter specification number); and "LAN-C IP network address" in field 8 (filter specification content). That is, the same contents are specified in the Cache Update message as in the SP Reply message explained in the first embodiment.

(3) On receiving the Cache Update message from SPH-A, SPR-C updates its egress cache for the shortcut path (step k). Also, SPH-A updates its own egress cache on receipt of the message from SPR-C (step p). As is apparent from the above explanation, both the egress cache and ingress cache are just refreshed, but not changed in contents, although "update" is indicated in FIG. 14B, steps i, k, m.

(4) As long as there is a packet to be forwarded, the above refresh operations in above steps (2) and (3) are repeated at a given period and thus, the shortcut path and also the egress and ingress caches of both end systems are maintained, However, if an end system does not receive a new Cache-Update message within a given time (longer than the above refresh period, e.g., 5 minutes), it clears the egress cache (step r), disabling the shortcut path even if it has not been disconnected. Therefore, when a packet flow to be forwarded in the opposite direction still remains, the default route should be used in place of the shortcut path. When an end system (e.g., egress system) has come not to receive the Cache Update message, the ingress cache of the other end system (e.g., ingress system) which sent the message has already been cleared (step s), because the end system sends the message after refreshing its ingress cache (step i).

(5) When both egress and ingress caches are cleared in both end systems SPH-A and SPR-C, either of the end systems conducts the network disconnect processing in the ATM layer. The disconnect processing is conducted usually (but not necessarily) by the end system which has sent the SETUP message. FIG. 14A shows an example in which the SPR-C sends the RELEASE message to SPH-A via ATM network 20, indicating to disconnect the path (step t).

(6) On receiving the RELEASE message, SPH-A releases the resource relating to the shortcut path and in reply, sends the RELEASE COMP message, indicating that the disconnect processing has been completed. The RELEASE COMP message is sent to SPR-C via ATM network 20, thus completing the disconnect processing.

To summarize the fifth embodiment, it maintains the shortcut path by continuously exchanging the Cache Update message periodically and when the message exchange has stopped, clears the egress and ingress caches and thereby disconnects the shortcut path. Since it maintains and disconnects the shortcut path by sending the Cache Update message, the shortcut path can be released when a packet flow ends normally or when an application ends communication even if the packet flow includes an abnormal packet.

Sixth Embodiment of Packet Transfer Method of the Present Invention

Figure 15A:
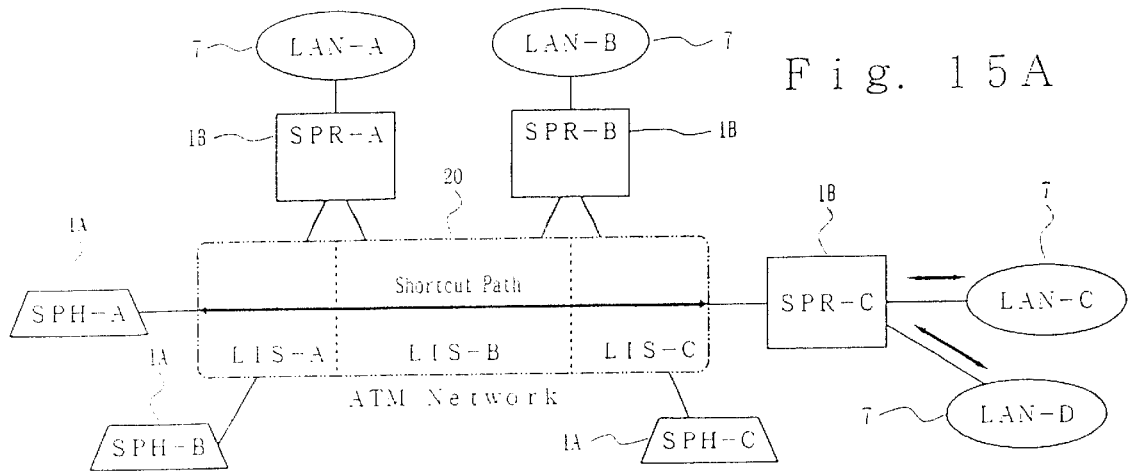
Figure 15B:
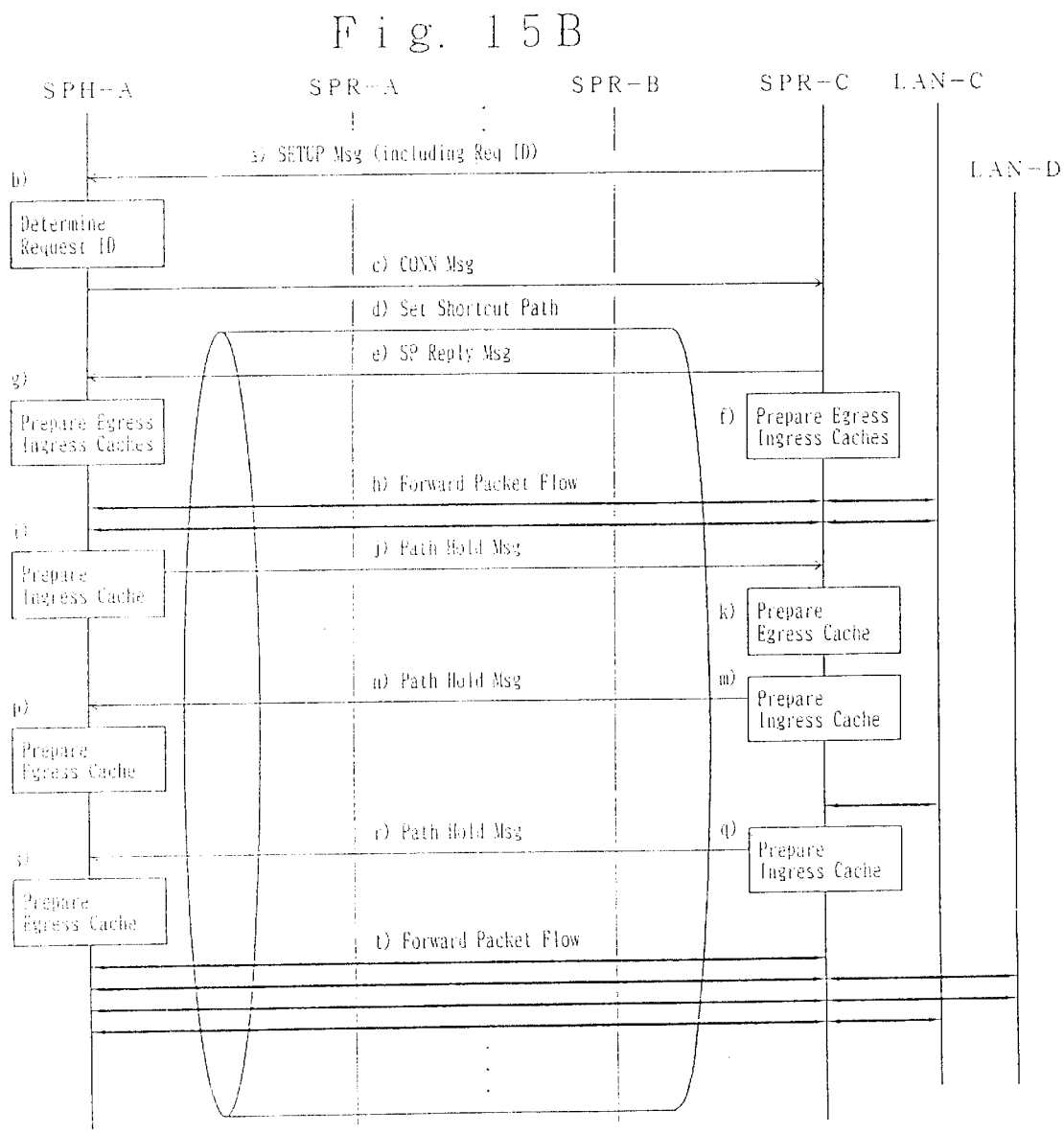

FIGS. 15A and 15B illustrate the packet transfer method of the sixth embodiment of the present invention,particularly to the method to mix a new packet flow with the packet flow which is already being forwarded through the shortcut path. The method to maintain and disconnect the shortcut path is the same as in the fifth embodiment. Assuming that a packet flow is already being forwarded between SPH-A and LAN-C through the shortcut path set in the first embodiment, a method is explained based on FIG. 15B referring to FIG. 15A, in which a packet flow which has been newly generated from LAN-D shares the shortcut path. It is also assumed that SPH-A specifies the packet flow to be filtered by the host address and SPR-C specifies the packet flow by the LAN-C network address. Also, SPR-C specifies the newly generated packet flow to be filtered by the LAN-D network address.

(1) FIG. 15B shows the operational sequence starting with SPR-C sending the SETUP message to request ATM network 20 to set a shortcut path. The sequence therefrom until a packet flow is forwarded through the shortcut path (steps a–h) is the same as in the first embodiment (FIG. 9, steps i–r). Also, the operation for SPH-A and SPR-C to exchange the Cache Update message while forwarding the packet flow so as to refresh or update the ingress and egress caches (steps i–q) and thus to maintain the shortcut path, is the same as in the fifth embodiment (see FIG. 14, steps i–p). Further, the contents to be specified in the Cache Update message are the same as in the fifth embodiment.

(2) Here, a packet flow to be forwarded to SPH-A is newly generated from LAN-D connected to SPR-C. On receiving the new packet flow, SPR-C first examines the egress cache based on the destination IP address and determines whether there is a shortcut path set for forwarding the new packet flow. Unless the cache has an entry indicating existence of a shortcut path, SPR-C executes the usual routing processing and performs the same processing as in the first embodiment. In this example, the egress cache of SPR-C is assumed to have the entry as shown in FIG. 20C. The egress cache has the SPH-A IP address stored in field 2, which address is the destination address of the packet flow generated from LAN-D. Also, it indicates that a shortcut path having VPI=0 and VCI=100 is set for the IP address and the sharing of the path is permitted. Accordingly, SPR-C determines the shortcut path to be available.

(3) To share the shortcut path which has already been set, SPR-C sends a new Cache Update message immediately to request the opposite end system to change the egress cache. Also, SPR-C changes its ingress cache (steps q, r). The new updated Cache Update message continues to be sent at a constant period with the following information specified therein. Fields 1–4 of FIG. 17C are unchanged. "Permissible" is specified in field 4 (VC sharing). Value "1", which has been specified in field 5 (number of filter specifications), is changed to "2". Two sets (above-explained one and the other added for this embodiment) of information are specified in fields 6–8. For the one set, "type 1" is specified in field 6 (filter specification number) and the LAN-C IP network address is specified in field 8 (filter specification content). For the other set, "type 1" is specified in field 6 (filter specification number) and LAN-D IP network address is specified in field 8 (filter specification content). When the LAN-C address and LAN-D address are consecutive numbers which can be united in one, they can be specified as one entry with the "number of filter specifications" specified as "1" and with only the address to be specified for the "filter specification content" changed.

(4) On receipt of the Cache-Update message, SPH-A changes the egress cache concerning the shortcut path (step s). However, SPH-A need not change the filter specification and therefore, continues to send the Cache Update message with its contents unchanged.

(5) FIGS. 21A–21D show the thus-changed egress and ingress caches of SPH-A and SPR-C. SPR-C sends a new Cache Update message with ingress cache field 3 (filter specification content) changed from the LAN-C IP network address (see FIG. 20D) to the LAN-C/LAN-D IP network address (see FIG. 21D). When receiving the message, SPH-A updates the egress cache field 1 (filter specification content) from the LAN-C IP network address (see FIG. 20D) to the LAN-C/LAN-D IP network addresses (see FIG. 21D) with the remaining fields unchanged. Thereafter, SPH-A and SPR-C transmit a packet flow to be forwarded between SPH-A and LAN-C/LAN-D by mapping it on the shortcut path based on their egress caches and receives the packet flow by filtering it based on their ingress caches.

To summarize the sixth embodiment, it changes the ingress and egress cashes concerning the shortcut path by periodically sending the Cache Update message and thereby allowing the shortcut path to be shared. When setting a shortcut path, it indicates that the path can be shared and thereby allowing multiplex packet flows to share the same shortcut path in a simple method as described above. Although the processing to remove a packet flow from those multiplexed is omitted to explain, it is apparent that the above-explained method can remove an unnecessary or faulty packet flow.

Embodiment of the End System of the Present Invention

FIG. 22 is a block diagram of the end system of the present invention, which details the end systems 10a–10d shown in FIG. 7. The end system represents a router or terminal connected directly to a communication network and can operate as either an ingress, egress or transit system. That is, it can.be either SPH (terminal) 1A or SPR (router) 1b. The end system consists of a flow determiner 11a, egress cache 11b, ingress cache 11c, shortcut path (abbreviated to SP) setting controller 12a, SP request processor 12b, SP reply processor 12c, SP initiation processor 12d, SP Initiation NAK processor 12e, SP holding processor 12f and SP monitor timer 12g. Elements 11a–11c and elements 12a–12g constitute flow determination means 11 and SP processing means 12 shown in FIG. 7, respectively. A network connection controller 13 and packet forwarding processor 14 correspond to the network connection means 13 and packet forwarding means 14 shown in FIG. 7, respectively. FIG. 22 illustrates the portion relating to packet transfer in greater detail and the functional units inherent in general router or terminal functions are omitted.

The operation of the end system of the present invention is explained referring to FIG. 22, with emphasis on the operation of the elements constituting end system 10. End system 10 is connected at an end to a communication network (e.g., ATM network) and at the other end either to a LAN or an NBMA network or nowhere. When connected to the LAN, end system 10 is an ingress system for a packet flow transmitted from a terminal to the network or an egress system for a packet flow transmitted vice versa. When connected to a network, it is a transit system for relaying the packet flow. When connected nowhere, it is a terminal itself. When connected to the communication network (ATM network), it is connected either through a default route or a route specified by an address defined in the network (e.g., ATM address). Both paths are shown in FIG. 22, in the composite, by a path 50 as physically the same. A signal path 60 is for requesting to set the VC path by using the network address or to disconnect the path. Path 50 for carrying a packet flow is usually used for path 60.

An example is explained in which a packet is forwarded from SPH-A to a terminal within a LAN-C which is connected to SPR-C, assuming that the communication network is an ATM network and that four sets of end systems 10 configured as in FIG. 22 are used as an ingress system SPH-A, transit system SPR-A and SPR-B and an egress system SPR-C as shown in FIG. 8, according to the part they play. Also, the TCP/IP is assumed to be used for the high-layer protocol.

When SPH-A starts forwarding a packet flow to the terminal within LAN-C, packet forwarding processor 14 of SPH-A sends the packet to the ATM network. The packet is sent to SPR-A through the default route. In SPR-A, packet forwarding processor 14 forwards the packet to SPR-B through the default route. On recognizing the packet as addressed to LIS-C under its control, SPR-B forwards the packet to SPR-C. SPR-C processes the received packet to forward it to the terminal within LANC.

In SPH-A, flow determiner 11a determines whether to forward the packet being forwarded by packet forwarding processor 14 through a shortcut path and when so determined, instructs SP setting controller 12a to set a shortcut path. Then, SP setting controller 12a instructs SP request processor 12b to prepare the SP Request message and instructs packet forwarding processor 14 to send the prepared message to the default route. The IP host address of the destination terminal within LAN-C is specified in the SP Request message in addition to the SPH-A ATM address and request ID. Also, the filter specification indicating the type of the flow SPH-A forwards is specified in the message.

In SPR-A, the SP Request messages received by SP controller 12a via packet forwarding processor 14. On recognizing the message as not addressed to SPR-A, SP setting controller 12a instructs packet forwarding processor 14 to forward the message to SPR-B through the default route. SPR-B forwards the message to SPR-C in the same process.

In SPR-C, on recognizing the SP Request message as addressed to the outside of the ATM network and itself as the egress system, the SP controller 12a processes the received message. SP controller 12a validates the message sender's (SPH-A) ATM address specified in the SP Request message and instructs network connection controller 13 to set a VC path to the ATM address. Then, network connection controller 13 sends the SETUP message including the request ID specified in the SP Request message, to the ATM network. The ATM network sets a VC path connecting SPR-C to SPH-A, which is a shortcut path bypassing the default route, in reply to the SETUP message.

In SPH-A, when receiving the SETUP message from the ATM network, network connection controller 13 passes the received message to SP setting controller 12a. SP setting controller 12a validates the request ID included in the SETUP message and instructs network connection controller 13 to send a CONN message to SPR-C in response to the SETUP message.

In SPR-C, when a shortcut path is set and the CONN message is received from SPH-A, SP setting controller 12a instructs SP reply processor 12c to prepare the SP Reply message including the filter specification for filtering the type of the flow which SPR-C transmits and instructs packet forwarding processor 14 to send the prepared SP Reply message to the shortcut path. Then, SPR-C stores the filter specification specified in the SP Reply message in the ingress cache 11c, so as to select a packet flow received from the shortcut path. It also stores the filter specification in egress cache 11b, for filtering a packet flow it transmits to the shortcut path.

In SPH-A, on receiving the SP reply message from SPR-C, SP setting controller 12a stores in the egress cache 11b, the filter specification specified in the SP Reply message so as to filter a packet flow it transmits to the shortcut path. It also stores in the ingress cache 11c, the filter specification which it specified in the previously-sent SP Request message so as to filter a packet flow received from the shortcut path. Since SP setting controller 12a passes the shortcut-path information (VPI/VCI) included in the previously-received SETUP message to packet forwarding processor 14, packet forwarding processor 14 transmits the following packets to the path having the VPI/VCI value, i. e., the shortcut path.

Thereafter, the packet flow is forwarded between SPH-A and SPR-C through the shortcut path. SPH-A flow determiner 11a transmits the packet flow by mapping it on the shortcut path based on the filter specification stored in egress cache 11b and SPR-C flow determiner 11a receives the packet flow by filtering it based on the filter specification stored in ingress cache 11c. While the packet is being forwarded, path monitor timers 12g of SPH-A and SPR-C respectively send timing pulses to the corresponding SP setting controller 12a at a constant period. When receiving the timing pulse, SP controller setting 12a refreshes ingress cache 11c and passes the refreshed ingress cache content to path holding processor 12f. Path holding processor 12f prepares the Cache Update message and packet forwarding processor 14 sends the message to the shortcut path.

In SPR-C and SPH-A, when the received Cache Update message is sent to SP setting controller 12a, it updates (usually refreshes) egress cache 11b according to the message. As long as the end system has a packet to be forwarded, ingress cache 11c and egress cache 11b are updated at a constant period. A system having no packet to be forwarded stops refreshing ingress cache 11c and sending the Cache Update message. Path monitor timer 12g monitors if corresponding ingress cache 11c and egress cache 11b are updated at a period longer than the above update period. If not, path monitor timers 12g clears caches 11c and 11b. The system whose ingress cache 11c is cleared does not use the shortcut path since it has no packet to be transmitted. However, When egress cache 11b is cleared, flow determiner 11a detects the fact and reports the fact to packet forwarding processor 14 and therefore, any remaining packet is forwarded through the default route.

In the above example, the ingress system sends the SP Request message and the egress system SPR-C sets a shortcut path. However, the same is true with the case in which the egress system SPR-C sends the SP Request message.

An example is explained below in which end system 10 is used as a transit system (SPR-A or SPR-B in FIG. 8). In SPR-A, if flow determiner 11a determines to set a shortcut path when end system 10 is forwarding a packet, it instructs SP setting controller 12a to set a shortcut path. When SPR-A is recognized as a transit system according to the instruction, SP setting controller 12a instructs SP initiation processor 12d to prepare the SP Initiation message and send the message through the default route to the ingress system SPH-A or the egress system SPR-C. On receipt of the SP Initiation message, SPH-A (or SPR-C) prepares the SP Request message and sends it to the opposite SPR-C (or SPH-A, respectively). The succeeding operations are the same as explained above.

Next, an example is explained below in which end system 10 which is used as an ingress system SPH-A or an egress system SPR-C, refuses the SP Initiation message received from the transit system. In ingress system SPH-A, when the SP Initiation message is received, SP controller 12a determines referring to a predetermined condition, whether a shortcut path can be set within SPH-A.

When determining that a shortcut path cannot be set, SP setting controller 12a instructs SP NAK processor 12e to prepare an SP Initiation NAK message and send the message to a predetermined destination transit system through the default route. The destination transit system is usually a router on the default route to which SPH-A is connected directly; however, it may be other transit systems depending on the network configuration.

When the destination transit system (e.g., SPR-A) receives the SP Initiation NAK message, it stands proxy for the ingress system SPH-A in sending the SP Request message to the egress system SPR-C. After a shortcut path is set, the transit system SPR-A relays a packet flow between the shortcut path leading to the egress system SPR-C and the default route leading to the ingress system SPH-A.

As explained above, the end system of the present invention, which has the functional units as shown in the FIG. 22 added to a usual router or a terminal, can set an appropriate shortcut path even when it is used as either an ingress, egress or transit system, without the need to provide a server exclusively for setting a shortcut path.

The packet transfer method and the end system of the present invention has been explained referring to FIGS. 3–22. However, the present invention is not limited to the disclosure given in the figures. For example, the embodiment is explained with the ATM network as the communication network and the TCP/IP as a high-layer protocol.

However, the communication network is not limited to the ATM network, but can be applied to a non-broadcast-type multiple-access network (NBMA network) including a packet network and frame relay network or the connection-type communication networks. Also, the high-layer protocol is not limited to the TCP/IP. The example is explained above with a terminal as a packet flow sender and a terminal within the LAN as the destination of a packet flow. However, the present invention can be applied e.g., to the case in which the packet flow sender is a terminal within the LAN or the destination is a router-function-equipped terminal or any combination of those. Also, the transit system is not limited to a router, but may be a router-function-equipped terminal.

The example is explained above in which the communication network has a single end system (or router) which attends to packet transfer between subnetworks LISs; however, there may be plural such end systems. Although in FIG. 8 for example, SPH-A which is connected to LIS-A forwards a packet to adjacent subnetwork LIS-B through SPR-A, the communication network may be configured such that SPH-B forwards a packet to LIS-B through a router (not shown in FIG. 8) other than SPR-A, which is connected to the same LIS-A.

Although FIG. 22 illustrates end system 10 as having all the functions used in the packet transfer method of the present invention, the end system need not necessarily have all such functions. The end system is not limited to that shown in FIG. 22, but can be other variations in configuration. For example in FIG. 22, to set a shortcut path, the end system is so configured as to include, in addition to SP setting controller 12a, elements 12b–12f corresponding to the kind of the messages sent/received to/from the opposite system. However, those elements may be combined with each other or merged with SP setting controller 12a. Although in FIG. 22, packet forwarding processor 14 and SP controller 12a are connected to each other via flow determiner 11a, they may be so configured as to send/receive information directly from/to each other.

As described above, on determining it as preferable to forward a packet flow through a shortcut path bypassing the default route, the present invention sets the shortcut path between an ingress system and an egress system, therefore providing an efficient packet transfer method. When setting the shortcut path, since a system reports its network address to the other through the default route, the present invention need not provide a server which stores the other system's network address therein and conducts the address resolution. Thus, the present invention need only have the default route established beforehand in order to set the shortcut path, therefore facilitating an initial construction and extention of a communication network.

Since a path-requesting end system reports its network address (e.g., ATM address) and uses the request ID in setting a shortcut path, the address information is free from leakage and therefore, security is guaranteed. Also, since the end system can manage without sending its network address to the default route as required, security is achieved. Since it is determined whether to set a shortcut path independently by end systems which are ingress, egress and transit systems, the present invention can prevent a load from concentrating on a specific end system and thus can distribute traffic.

Since the protocol for seting a shortcut path need only exchange a simple message between the systems locating at both ends, an end system can easily install the protocol. Since the end systems exchange the filter specification, the present invention can control a packet flow passing through the shortcut path and prevent a faulty packet from flowing in and out of the end system, therefore guaranteing security. Since the systems at both ends of the shortcut path exchange the Cache Update message including the filter specification at a constant period, the present invention can set and disconnect a shortcut path in synchronization with the communication initiated and terminated by a high-layer application, thus preventing the shortcut path from remaining set accidentally or intentionally by a faulty packet.

Since the ingress, egress and transit systems (routers or terminals) perform the shortcut-path-setting function individually, the present invention can provide a perfectly autonomous and distributed control system and can localize a fault, i.e., prevent a local fault from spreading to the entire network.

Because of the autonomous and distributed control, end systems need only manage the address information as required, unlike the server/client control method which need store in the server and control, the information concerning routers and terminals within and also outside the subnetwork concerned, thus facilitating the maintenance and management of the network system and allowing each end system to take security measures. Since a packet flow occurring halfway and meantime can share the shortcut path with others and a packet flow can be removed halfway from the shortcut path, a network with high use efficiency can be constructed.

What is claimed is:

1. An apparatus for transferring a packet flow in a communication network in which a packet is transferred from a first device to a second device through a third device over a default route, comprising:

determination means provided in one of the first and second devices or the third device, for determining, based on the packet transferred over the default route, whether to set a path directly connecting the first device to the second device; and request means provided in the one of the first and second devices, in dependence upon the determining by said determination means, for requesting the other of he first and second devices to set the path.

2. The apparatus according to claim 1, further comprising:

instruction means provided in the other of the first and second devices, for instructing the communication network to set the path.

3. An apparatus for transferring a packet flow having a plurality of packets in a communication network which includes a plurality of subnetworks, first and second end systems connected to the respective subnetworks and a transit system for relaying the packet and a message between the first and second end systems through a default route, the packet flow forwarded from the first end system to the second end system or to a terminal connected thereto, said apparatus comprising:

determination means provided in the first end system, for determining based on the packet to forward the packet flow through a shortcut path bypassing the default route; and request means provided in the first end system, in dependence upon the determining by said determination means, for sending to the second end system through the default route, a request message requesting to set a shortcut path, including an address of the first end system.

4. The apparatus according to claim 3, said apparatus further comprising:

connection means provided in the second end system, for sending to the communication network, a setup message instructing to set the shortcut path between the first and second end systems in accordance with the request message sent by said request means.

5. An apparatus for transferring a packet flow having a plurality of packets in a communication network which includes a plurality of subnetworks, first and second end systems connected to the respective subnetworks and a transit system for relaying the packet and a message between the first and second end systems through a default route, the packet flow forwarded from the first end system to the second end system or to a terminal connected thereto, said apparatus comprising:

determination means provided in the second end system, for determining based on the packet received through the default route to forward the packet through a shortcut path bypassing the default route; and request means provided in the second end system, in dependence upon the determining by said determination means, for sending to the first end system through the default route, a request message requesting to set a shortcut path, including an address of the second end system.

6. The apparatus according to claim 5, further comprising:

connection means provided in the first end system, for sending to the communication network, a setup message instructing to set a shortcut path between the first and second end systems in accordance with the request message sent by said request means.

7. An apparatus for transferring a packet flow having a plurality of packets in a communication network which includes a plurality of subnetworks, first and second end systems connected to the respective subnetworks and a transit system for relaying the packet and a message between the first and second end systems through a default route, the packet flow forwarded from the first end system to the second end system or to a terminal connected thereto, said apparatus comprising:

determination means provided in the transit system, for determining based on the packet received through the default route to forward the packet flow through a shortcut path bypassing the default route;

command means provided in the transit system, in dependence upon the determining by said determination means, for sending a command message commanding to request to set a shortcut path, to one of the first and second end systems through the default route; and request means provided in one of the first and second end systems, in accordance with the command message sent by said command means, for sending a request message requesting to set a shortcut path, including an address of the one of the first and second end systems, to the other of the first and second end systems through the default route.

8. The apparatus according to claim 7, further comprising:

connection means provided in the other of the first and second end systems, for sending to the communication network, a setup message instructing to set a shortcut path between the first and second end systems in accordance with the request message sent by said request means.

9. The apparatus according to claim 4, further comprising:

forwarding means provided in the first and second end systems, for forwarding the packet flow through the shortcut path set by said connection means.

10. The apparatus according to claim 3, wherein the request message further includes request identification information for identifying the request message, for use in the a message.

11. The apparatus according to claim 10, wherein the request message further includes specification information for indicating a specification of the packet which the one of the first and second end systems can receive through the shortcut path; and wherein said apparatus further comprises reply means provided in other of the first and second end systems, for sending in reply to the request message, a reply message including a specification of the packet which the other of the first and second end systems can receive through the shortcut path.

12. The apparatus according to claim 7, further comprising:

suppression means provided in the transit system, for suppressing the command message received from the same direction as in which the transit system is sending the command message.

13. The apparatus according to claim 7, further comprising:

refusal means provided in the one of the first end systems, for sending to the transit system, a refusal message refusing to execute the received command message;

proxy means provided in the transit system, in response to the refusal message, for sending to the other of the first and second end systems through the default route, a request message requesting to set a shortcut path, including an address of the transit system;

connecting means provided in the other of the first and second end systems, for instructing the communication network to set a shortcut path between the transit system and the other of the first and second end systems in accordance with the request message sent by said proxy means; and relaying means provided in the transit system, for relaying the packet flow between the transit system and the one of the first and second end systems through the default path and relaying the packet flow between the transit system and the other of the first and second end systems through the shortcut path set by said connecting means.

14. The apparatus according to claim 3, further comprising:

path-holding means provided in the first end system, second end system or transit system which is on a side of the shortcut path set, for periodically sending a path-holding message instructing to keep the shortcut path set, to the counterpart located on the other side of the shortcut path through the shortcut path and for disconnecting the shortcut path when the path-holding message is not received within a predetermined period.

15. The apparatus according to claim 14, wherein the path-holding message includes specification information for indicating a specification of the packet which the path-holding-message sending first end system, second end system or transit system can receive through the shortcut path and when to send a new packet flow on the already-set shortcut path or stop sending a packet flow being sent on the shortcut path, the path-holding message is sent with the specification information changed accordingly.

16. The apparatus according to claim 3, wherein said request means continues to send the request message periodically until the shortcut path is set.

17. The apparatus according to claim 7,
wherein said command means continues to send the command message periodically until the shortcut path is set or a refusal message is received.

18. A method for transferring a packet flow in a communication network in which a packet is transferred from a first device to a second device through a third device over a default route, comprising the steps of:

in one of the first and second devices or the third device, determining based on the packer transferred over the default route, whether to set a path directly connecting the first device to the second device; and requesting the other of the first and second devices to set the path in dependence upon said determining.

19. The method according to claim 18, further comprising the step of:

in the other of the first and second devices instructing the communication network to set the path.

20. A method for transferring a packet flow having a plurality of packets in a communication network which includes a plurality of subnetworks, first and second end systems connected to the respective subnetworks and a transit system for relaying the packet and a message between the first and second end systems through a default route, the packet flow forwarded from the first end system to the second end system or to a terminal connected thereto, said method comprising the steps of:

(a) in the first end system, determining based on the packet to forward the packet flow through a shortcut path bypassing the default route and in dependence upon the determining, sending to the second end system through the default route, a request message requesting to set a shortcut path, including an address of the first end system;

(b) in the second end system, requesting the communication network to set the shortcut path between the first and second end systems in accordance with the request message sent by step (a); and (c) in the first and second end systems, forwarding the packet flow through the shortcut path set by step (b).

21. A method for transferring a packet flow having a plurality of packets in a communication network which includes a plurality of subnetworks, first and second end systems connected to the respective subnetworks and a transit system for relaying the packet and a message between the first and second end systems through a default route, the packet flow forwarded from the fist end system to the second end system or to a terminal connected thereto, said method comprising the steps of:

(a) in the second end system, determining based on the packet received through the default route to forward the packet flow through a shortcut path bypassing the default route and in dependence upon the determining, sending to the first end system through the default route, a request message requesting to set a shortcut path, including an address of the second end system;

(b) in the first end system, requesting the communication network to set a shortcut path between the first and sccond end systems in accordance with the request message sent by step (a); and (c) in the first and second end systems, forwarding the packet flow through the shortcut path set by step (b).

22. A method for transferring a packet flow having a plurality of packets in a communication network which includes a plurality of subnetworks, first and second end systems connected to the respective subnetworks and a transit system for relaying the packet and a message between the first and second end systems through a default route the packet flow forwarded from the first end system to the second end system or to a terminal connected thereto, said method comprising the steps of:

(a) in the transit system, determining based on the packet received through the default route to forward the packet flow through a shortcut path bypassing the default route and in dependence upon the determining, sending a command message commanding to request to set a shortcut path, to one of the first and second end systems through the default route;

(b) in one of the first and second end systems, in accordance with the command message sent by step (a), sending a request message requesting to set a shortcut path, including an address thereof, to the other of the first and second end systems through the default route;

(c) in the other of the first and second end systems, requesting the communication network to set a shortcut path between the first and second end systems in accordance with the request message sent by step (b); and (d) in the first and second end systems, forwarding the packet flow through the shortcut path set by step (c).

23. A method for transferring a packet flow between first and second devices in a network which has a plurality of subnetworks connected through a transit device, the first and second devices connected to respective subnetworks, comprising the steps of:

in the first device, sending the first device's address information which is defined in the network, to the second device through the transit device; and in the second device, setting a communication path between the first and second devices based on the first-device address information.

24. A terminal connected to one of a plurality of subnetworks constituting a network which has the subnetworks connected through a transit device, comprising:

means for preparing a message including information requesting to set a communication path and the terminal's address information which is defined in the network; and means for sending the message through the transit device to another terminal with which the terminal is to communicate.

25. A terminal connected to one of a plurality of subnetworks constituting a network which has the subnetworks connected through a transit device, comprising:

means for receiving a packet from another terminal through the transit device; and means for recognizing that the received packet includes information requesting to set a communication path and the another terminal's address information which is defined in the network and for setting the communication path between the terminal and the another terminal, based on the received packet.

26. An apparatus for transferring a packet flow in a communication network in which a packet is transferred from a first device to a second device over a default route, comprising:

determination means provided in one of the first and second devices, for determining based on the packet transferred over the default route, whether to set a path directly connecting the first device and the second device; and request means provided in the one of the first and second device, for requesting the other of the first and second devices to set the path in dependence upon the determining by said determination means.

* * * * *